US012803340B2

(12) United States Patent
Ash

(10) Patent No.: US 12,803,340 B2

(45) Date of Patent: Nov. 17, 2026

(54) ELECTRIC MACHINE, ROTOR AND STATOR

(71) Applicant: Electrified Automation Limited, Bridgwater (GB)

(72) Inventor: Lloyd Conway Ash, Bridgwater (GB)

(73) Assignee: Electrified Automation Limited, Bridgwater (GB)

(*) Notice: Subject to any disclaimer, the term of this patent is extended or adjusted under 35 U.S.C. 154(b) by 341 days.

(21) Appl. No.: 18/277,205

(22) PCT Filed: Feb. 17, 2022

(86) PCT No.: PCT/EP2022/054025

§ 371 (c)(1),
(2) Date: Aug. 14, 2023

(87) PCT Pub. No.: WO2022/175421

PCT Pub. Date: Aug. 25, 2022

(65) Prior Publication Data

US 2024/0146124 A1 May 2, 2024

(30) Foreign Application Priority Data

Feb. 19, 2021 (GB) ...................................... 2102330
Feb. 25, 2021 (GB) ...................................... 2102697
(Continued)

(51) Int. Cl.
*H02K 1/14* (2006.01)
*H02K 1/276* (2022.01)
(Continued)

(52) U.S. Cl.
CPC ............. *H02K 1/146* (2013.01); *H02K 1/276* (2013.01); *H02K 3/522* (2013.01); *H02K 21/16* (2013.01); *H02K 2203/12* (2013.01)

(58) Field of Classification Search
CPC ........ H02K 1/146; H02K 1/148; H02K 1/276; H02K 15/022; H02K 15/066; H02K 21/16; H02K 2203/12; H02K 3/522
(Continued)

(56) References Cited

U.S. PATENT DOCUMENTS 4,874,977 A 10/1989 Safranek
5,705,864 A 1/1998 Takano et al.
(Continued)

FOREIGN PATENT DOCUMENTS

CN 104167889 A 11/2014
CN 208754084 U 4/2019
(Continued)

*Primary Examiner* — Alex W Mok

(74) *Attorney, Agent, or Firm* — Smartpat PLC

(57) ABSTRACT

The present invention relates to electric machines, rotors for electric machines, stators for electric machines, stator core assemblies and methods of assembly associated therewith. In embodiments a stator core comprises an articulated array of core segments each segment being hingedly connected to at least one adjacent core segment such that the core has a first configuration in which the core segments form an open array and a second configuration in which the core segments form a closed annular array. Each core segment may have an L-shaped profile comprising: a body defining a segment of an annular ring; and pole tooth projecting radially from the annular ring segment. The body comprises first and second complementary interface surfaces at respective circumferentially opposing sides. One of the interface surfaces extends through a circumferential footprint of the pole tooth.

7 Claims, 19 Drawing Sheets

(30) Foreign Application Priority Data

Feb. 3, 2022 (GB) ...................................... 2201424
Feb. 3, 2022 (GB) ...................................... 2201425

(51) Int. Cl.
*H02K 3/52* (2006.01)
*H02K 21/16* (2006.01)

(58) Field of Classification Search
USPC .................................................... 310/216.105
See application file for complete search history.

(56) References Cited

U.S. PATENT DOCUMENTS 5,986,377 A 11/1999 Yamada et al.
6,242,835 B1 * 6/2001 Uemura ................. H02K 3/493 310/214
7,019,433 B2 * 3/2006 Hashimoto ............ H02K 29/03 310/402
7,111,380 B2 * 9/2006 Sheeran ................. H02K 1/148 310/194
8,354,769 B2 * 1/2013 Naganawa ............. H02K 1/146 310/91
8,661,651 B2 3/2014 Tsuiki et al.
9,209,659 B2 * 12/2015 Mori ...................... H02K 1/148
9,614,406 B2 * 4/2017 Johnson ................... H02K 3/48
9,954,407 B2 * 4/2018 Foulsham .............. H02K 3/345
10,243,438 B2 * 3/2019 Li .......................... H02K 29/03
10,243,439 B2 * 3/2019 Li .......................... H02K 29/03
10,439,455 B2 10/2019 Nakano et al.
2003/0160532 A1 8/2003 Suzuki et al.
2004/0074079 A1 4/2004 Jack et al.
2010/0001612 A1 1/2010 Nagai et al.
2011/0025165 A1 2/2011 Naganawa et al.
2011/0175485 A1 * 7/2011 Naganawa ............. H02K 1/146 310/214
2011/0298317 A1 12/2011 Bradfield
2014/0214275 A1 7/2014 Miller et al.
2015/0008785 A1 * 1/2015 Mori ...................... H02K 3/522 310/216.069
2016/0254735 A1 9/2016 Gilmore et al.
2017/0256999 A1 9/2017 Turner et al.
2017/0294812 A1 10/2017 Nakano et al.
2020/0076284 A1 3/2020 Stoll et al.
2020/0144898 A1 5/2020 Maier et al.
2020/0313509 A1 10/2020 Tucker et al.
2022/0085695 A1 3/2022 Sinz et al.
2023/0152129 A1 5/2023 Chen

FOREIGN PATENT DOCUMENTS

| | | | |
|---|---|---|---|
| CN | 112325912 | A | 2/2021 |
| CN | 115133726 | A | 9/2022 |
| DE | 19737702 | A1 | 4/1999 |
| DE | 102012214567 | A1 | 2/2014 |
| DE | 102016215661 | A1 | 3/2017 |
| EP | 0871282 | A1 | 10/1998 |
| EP | 1168570 | A2 | 1/2002 |
| EP | 1339156 | A2 | 8/2003 |
| EP | 2144348 | B1 | 4/2017 |
| GB | 28846 | A | 5/1930 |
| GB | 2572782 | A | 10/2019 |
| JP | 2000069727 | A | 3/2000 |
| JP | 2004312910 | A | 11/2004 |
| JP | 2009050055 | A | 3/2009 |
| JP | 2011015533 | A | 1/2011 |
| JP | 2011172432 | A | 9/2011 |
| JP | 2013070494 | A | 4/2013 |
| JP | 2016208615 | A | 12/2016 |
| JP | 2020162198 | A | 10/2020 |
| RU | 2710902 | C1 | 1/2020 |
| WO | 0195459 | A1 | 12/2001 |
| WO | 2008069166 | A1 | 6/2008 |
| WO | 2009129882 | A1 | 10/2009 |
| WO | 2011080140 | A2 | 7/2011 |
| WO | 2014024988 | A1 | 2/2014 |
| WO | 2016093267 | A1 | 6/2016 |
| WO | 2020126821 | A1 | 6/2020 |
| WO | 2021140714 | A1 | 7/2021 |

* cited by examiner

ELECTRIC MACHINE, ROTOR AND STATOR

FIELD OF INVENTION

The present invention relates to electric machines, rotors for electric machines, stators for electric machines, stator core assemblies and methods of assembly associated therewith.

BACKGROUND

Electric machines (which it will be appreciated is used as a general term for a machine which uses electromagnetic forces such as an electric motor or generator) may consist of a stator and a rotor and operate through the interaction of the machines magnetic field.

A common stator configuration comprises a laminated body (which may, for example, be stamped from steel) defining a generally annular body with a plurality of radially extending pole teeth. Each pole tooth is surrounded by an electrical winding in the assembled electric machine. An insulator bobbin may be provided which substantially surrounds each pole tooth and onto which the wire of the electrical winding is wound. One way to provide the electrical winding is to pre-wind electrical wire onto the insulator bobbin such that it can then be placed over a pole tooth as a unit.

Manufacturing cost is a key consideration in the design of electrical machines and as such a number of different stator assembly methods have been proposed. In some arrangements the stator core may be divided into a number of stator core segments which come together to form the full annular stator core lamination. Each core segment comprises a part of the annular body and a single pole tooth. One advantage of such segmented stator cores is that they can simplify the winding process since the winding may be positioned around each stator pole to assembly of the full stator. In other designs, such as that shown in European Patent Application EP 0 871 282 A1, the individual stator core segments are linked together by flexible portions such that the stator core has an open configuration in which the segments form an open or linear array and a closed configuration in which the segments form an annular array. To aid manufacture the stator of EP 0 871 282 A1 also includes pole teeth having tooth tips which are initially radially projecting to allow placement of a bobbin carrying the windings onto each pole tooth. Once the bobbin is in place the tooth tips are pressed to form a profile having generally sideways/circumferential extending tooth tips.

One form of electric machine is a permanent magnet motor in which typically use a stator comprising a plurality of electric windings in combination with an array of permanent magnets in the rotor. Permanent magnet rotors are generally categorised as either a surface permanent magnet ("SPM") arrangement in which permanent magnets are attached at an outer surface of the rotor or an interior permanent magnet (IPM) rotor in which the permanent magnets are embedded within the rotor. IPM motors in particular may have high power density, good efficiency and wide speed range performance and as such there is high demand for IPM motors for applications such as Electric Vehicles (EVs).

Electric machines may also include a rotary encoder which monitors the position and movement of the rotor relative to the stator. This is particularly true for modern brushless motors in which position feedback is required for motor control. A rotary encoder may comprise a coding (or "target") on one moving part and an encoder sensor on the other of the moving part which detects the coding during relative movement. A common form of rotary encoder for use in electric machines may use electro-magnetic interaction between the coding and encoder sensor. Thus, the coding may typically be a target comprising at least one (and usually a plurality of circumferentially distributed) features having a magnetic reluctance which can be detected when in rotational alignment with at least one (and usually a plurality of circumferentially distributed) electro-magnetic sensors of the sensor. The sensor may be conveniently formed on a printed circuit board (PCB) for example as printed induction coils.

There remains a desire to provide further improvements in the ease of manufacture and/or maintenance of electric machines and stators and rotors for electric machines. For example, it is desirable to provide assemblies for electric machines, including rotors and/or stators with a reduced part count and which may be suitable for automated assembly. In particular there is a desire to provide improved arrangements suitable for high volume manufacture

SUMMARY OF INVENTION

According to one aspect of the invention, there is provided a stator core comprising an articulated array of core segments each segment being hingedly connected to at least one adjacent core segment such that the core has a first configuration in which the core segments form an open array and a second configuration in which the core segments form a closed annular array. Each core segment has an L-shaped profile comprising: a body defining a segment of an annular ring; and pole tooth projecting radially from the annular ring segment. The body comprises first and second complementary interface surfaces at respective circumferentially opposing sides. One of the interface surfaces extends through a circumferential footprint of the pole tooth.

The applicant has recognised that the use of an L-shaped segment (which results in a join line between adjacent segments in the footprint of the pole tooth) provides both structural and magnetic field advantages in the final stator. As such embodiments may provide a stator which is more optimised than conventional T-shaped segmented stators.

It may be appreciated that the footprint of the pole tooth is the portion of the body which is between the circumferentially opposing sides of the pole tooth. The footprint may be radially outside or radially inside of the pole tooth (depending upon whether the stator is of the type having an external stator core and radially inwardly projecting pole teeth or the type having an internal annular stator core with outwardly projecting pole teeth).

Adjacent first and second complementary interface surfaces of adjacent core segments may abut when the stator core is in a closed configuration and may be spaced apart when the stator core is in the open configuration.

The interface surface extending through the circumferential footprint of the pole tooth may extend through substantially the entire circumferential extent of the footprint of the pole tooth. In embodiments the interface surface extending through the circumferential footprint of the pole tooth may be an inclined surface extending through a footprint of the pole tooth. In some embodiments the interface surface extending through the circumferential footprint of the pole tooth may extend at an oblique angle through the body. The angle may be oblique relative to the radial direction. As such, the interface surface may be a tapered surface extending through the thickness of the body.

The interface surface extending through the circumferential footprint of the pole tooth may extend circumferentially beyond the pole tooth. For example, the core segment may comprise a flange at the foot of the pole tooth (the flange may extend circumferentially away from the pole tooth). The interface surface extending through the circumferential footprint of the pole tooth may extend from the flange through the footprint of the pole tooth. The interface surface may, therefore, start at one side of the pole tooth, extend through the circumferential footprint and end on the other side of the pole tooth.

A hinge connection may be provided between adjacent first and second complementary interface surfaces of adjoining core segments. The interface surface extending through the circumferential footprint of the pole tooth may extend from a first end radially proximal to the pole tooth to a second end radially distal to the pole tooth. In some embodiments, for example, the first end may be at the flange at the foot of the pole tooth. The hinge connection may be at the second end of the first interface segment.

The hinge connection may comprise a web. The web may provide a living hinge between adjoining core segments. The web may be elongate, for example circumferentially elongate. The web may, for example, extend at least partially along a portion of one of the segments. For example the web may be separated from the segment by a generally circumferentially aligned slot The web may further provide a resilient connection between the adjoining core segments, the web may bias the core segments towards the open position. For example, the web may act as a leaf spring.

Advantageously, the provision of a web as a hinge between adjacent core segments helps to avoid or reduce stress concentrations that might occur at the hinge. For example the bending of the material of the hinge can be progressive and spread along the length of the web. This is important in reducing or removing the risk of failure of the hinge in either manufacture or use. The reduced risk of failure at the hinge also ensures that the hinge can be safely formed as an integral part of the stator laminations and does not for example need to be a separate component formed from a more pliable material.

The first and second complementary interface surfaces may comprise at least one inter-engagement feature. The inter-engagement feature may for example comprise a male feature on one of the first and second complementary interface surfaces and a complementary female feature on the other of the first and second complementary interface surfaces. The inter-engagement feature may provide a positive location when the surfaces are brought together. The inter-engagement feature may radially align adjacent segments in the closed position.

When the stator is in the closed configuration the web may provide a tensile force which acts to hold the inter-engagement feature in alignment. For example, the web may provide a radial and/or circumferential bias at the complementary interface surfaces of adjacent segments. The inter-engagement feature may hold the adjacent segments in alignment against said bias. In other words, the spring force of the web may provide a positive engagement between the inter-engagement features when the stator is in the closed/annular configuration.

To provide an open configuration the array of articulated core segments may comprise first and second end segments which are hingedly connected to only one adjacent core segment. As may be appreciated, the end segments may be at opposite ends of the stator array. The core segments intermediate to the end segments may each be hingedly connected to a pair of adjacent core segments. For example, the intermediate segments may each include a first complementary interface surface hingedly connected to the second interface surface of one adjoining core segment and a second complementary interface surface (at the opposing circumferential side of the segment body) hingedly connected to the first interface surface of another adjoining core segment.

The first end segment may comprise a first end face and the second end segment may comprise a second end face. When the stator core is in the open configuration the first and second end faces may be at opposing free ends of the array. When the stator core is in the closed annular configuration first and second end faces may abut. The end faces may be provided with complementary engagement features. The complementary engagement features may resiliently engage to hold the stator core in the closed annular array configuration. One of the end faces may be provided with a latch to engage a corresponding feature on the other end face. The latch may be configured to engage an arm extending from the opposing end face. The latch may comprise a generally circumferentially extending arm and a generally radially aligned head (the head may define a radially extending latch face).

According to another aspect of the invention, there is provided a stator core segment comprising: a body defining a segment of an annular ring; and a pole tooth projecting radially from the body; the pole tooth comprising a pair of tooth tips which have an initial configuration in which they extend longitudinally with respect to the pole tooth and an assembled configuration in which they extend transversely to provide a flange at the pole tooth end; and wherein each tooth tip comprises a web contiguous with the pole tooth and a head at the distal end of the web and the pole tooth has a recess in the shoulder proximal to each tooth tip the recess defining a seat to receiving and aligning a portion of the head when the tooth tip is in assembled configuration.

The longitudinal direction is generally radial when the stator is assembled. The transverse direction is generally circumferential when the stator is assembled.

The head may comprise a first portion proximal to the web and a second portion distal to the web and wherein in the assembled configuration the first portion engaging the seat and the second portion extending transversely beyond the pole tooth. First portion of the head and the seat may have complementary profiles and may for example resiliently engage. The seat may include an undercut portion. The head may have a profile defining a latch for engaging the undercut. The head may have a wedge or arrow-shaped profile, for example tapering in thickness distally. The head portion proximal to the web may be define a notch or barb, the notch or barb may be a latch to engage the undercut of the seat.

Advantageously, the provision of an engagement in which the tooth tip is resiliently engaged in the assembled position may not only assist with accurate alignment but may also ensure that the stator has a designed degree of redundancy with the tip retained by both the seat and the web. This may for example increase the reliability of the stator long term by reducing any risks associated with fatigue or wear.

The stator core segment may further comprise a bobbin carrying a coil. The bobbin is formed of an insulating material, for example from a moulded plastic. The bobbin may be positioned over the pole tooth prior to the tooth tips being deformed to their transverse position. For example, the bobbin may be slid onto the pole tooth in the longitudinal direction. The bobbin may engage the second portion of the head of the tooth tip when the tip is in the assembled configuration. For example, the bobbin may resiliently engage the distal end of the tooth tip. Thus, in some embodiments both the distal and proximal ends of the tooth tip may be engaged when in the assembled position.

According to another aspect of the invention, there is provided an insulator bobbin for mounting a coil on the pole tooth of a stator core. The bobbin comprises: a sleeve defining an outer surface for mounting a coil and an inner bore for receiving a stator core pole tooth. A flange is provided at a first end of the sleeve defining a skirt for abutting a stator core. A retractable flange is provided at the second end of the sleeve. The retractable flange is resiliently biased to a position whereby the flange does not protrude beyond the outer surface of the sleeve. Positioning the bobbin on a stator core pole tooth deflects the retractable flange to a position in which it projects from the outer surface of the sleeve.

Embodiments of the invention may be particularly advantageous in optimising manufacture of a stator or electric machine. For example, the retractable flange enables a pre wound coil to be slid onto the bobbin over the end having the retracted flange and positioned on the sleeve and relative to the fixed flange. Subsequently a coil and insulator may be placed onto a stator core tooth with the retractable flange deployed into position. Such embodiments may not only simplify the automation of manufacture but may also be particularly beneficial when seeking a high density (or high fill factor coil). For example, if a coil is wound directly onto an insulator bobbin care must be taken to ensure that the insulator is not damaged, this may for example limit the pressure applied during winding. In contrast a pre-wound coil could be formed on a robust mandrel or tool which would enable high pressure to be applied and maximise the density of the winding.

The retractable flange may comprise a pair of opposed flange members. The opposed flange members may be biased inwardly towards one another. The opposed flange members may be forced outwardly by a stator core pole tooth. For example, the opposed flange members may be moved outwardly by engagement between an outer surface of the pole tooth and an inner surface of the flange members.

Each member may be carried by a resilient arm. The resilient arm may extend longitudinally along the length of the passage. The resilient arm may have a cantilever connection to the body of the bobbin at the end distal to the member. In its undeflected position the resilient arms may slant inwardly from the sleeve into the inner passage. In the deflected position the arms may be aligned with the sleeve. Positioning of the bobbin on a stator core pole tooth may cause the arms to splay outwardly due to the sides of the pole tooth engaging and acting against the inner surfaces of the arms.

In an assembled stator the retractable flange of adjacent bobbins may abut. Accordingly, the end faces of the retractable flange may have complementary interface surface comprises first and second complementary interface surfaces at respective circumferentially opposing sides of the body.

The sleeve may be in the form of rectangular tube. The pair of opposed flange members may be formed in opposing side walls of the sleeve (for example side walls which will be on circumferentially opposing sides of the pole tooth when assembled). The sleeve may further comprise end walls (adjoining the opposing side walls). The end walls may be spaced apart in the axial direction when assembled to the stator.

The bobbin is formed of an insulating material, for example from a moulded plastic.

The bobbin may be positioned over the pole tooth of the stator prior to pole tooth tips being deformed into their final position. For example, the bobbin may be slid onto the pole tooth in the longitudinal direction.

The bobbin may be configured to engage an end of the tooth tip when the tip is in the assembled configuration. For example, the bobbin may resiliently engage the distal end of the tooth tip.

The retractable flange of the insulator may be configured to resiliently engage the ends of the stator pole tips. The retractable flange may, for example, comprise a latch for engaging the pole tips. For example, one of the flange portions may comprise a pair of opposed jaws. The jaws may engage opposing tooth tips of adjacent pole teeth in an assembled stator. The ends of the pole tips may be urged into engagement with the jaws when the stator is placed into a closed annular form (in particular as the tooth tips are deflected into their assembled position). The jaws may resiliently deflect, and may snap fit engage the ends of the pole tips.

Advantageously, the provision of an arrangement in which the tooth tip and bobbin flange resiliently engage both ensures accurate and highly precise assembly of the stator and also gives a designed degree of redundancy. This may, for example, increase the reliability of the stator long term by reducing any risks associated with fatigue or wear.

According to a further aspect of the invention, there is provided an electric machine comprising: a rotor having a coding for a rotary encoder; and a stator assembly comprising a stator core, a plurality of coils mounted to the core; and a rotary encoder for detecting the coding on the rotor, wherein the encoder comprises an encoder PCB fixed relative to the stator core the PCB further comprising an integral temperature sensor, the temperature sensor mounted on an arm extending from the encoder PCB to position the temperature sensor proximal to one of the plurality of coils.

Providing a temperature sensor integral with the encoder PCB may reduce the need for an additional component and therefore reduce the overall part count and simplify the assembly of the electric machine.

The arm may extend radially from the encoder PCB. The arm may resiliently hold the temperature sensor against an external surface of the coil (for example the arm may provide a spring bias to urge the temperature sensor into position against the coil). Due to the resilient hold provided by the arm of the encoder PCB the temperature sensor may need no direct attachment to the stator (for example it is not necessary to screw or bond the temperature sensor in place).

The arm may have a necked profile, for example the necked portion of the arm may reduce the spacing required for the arm to pass between stator components (for example busbars connecting stator coils).

The temperature sensor may be provided on an enlarged head, for example at the radially distal end of the arm.

The rotary encoder may further comprise a daughterboard mounted to the encoder PCB. This may be advantageous in its own right. Accordingly, in another aspect of the invention there is provided an electric machine comprising: a rotor having a coding for a rotary encoder; a stator assembly and a rotary encoder for detecting the coding on the rotor, wherein the encoder comprises an encoder PCB fixed relative to the stator and a daughterboard attached to the encoder PCB.

The encoder PCB may for example comprise an internal face abutting a portion of the stator core (and facing the rotor) and an opposing external face, the daughterboard may for example be mounted to the external face. The daughterboard may be removably attached to the encoder PCB. The daughterboard may be replaceable. The encoder PCB may be attached to an internal surface of a cover of the stator, for example an end cover. The daughterboard may be attached to the encoder PCB via a window in the stator cover. Thus, the daughterboard may be externally mounted to the stator (in contrast to the internally mounted encoder PCB.

The encoder PCB may comprise the inductive circuitry (for example coils) for sensing the coding on the rotor. The daughterboard may for example include the encoder controller. The daughterboard may comprise the inductive coding chip connected to the inductive circuitry of the encoder PCB. Thus, the PCB encoder, may for example, passively detect the coding on the rotor whilst the daughterboard may comprise the processor to determine the position and/or movement data of the rotor. The daughterboard may include a communications output for transmitting motor data, for example to a computer.

Advantageously, embodiments may enable the daughterboard to be replaced or upgraded in use without the need to remove the encoder PCB from the stator. This is beneficial because the positioning of the encoder PCB relative to the stator must be highly precise to ensure that the encoder operates accurately and reliably.

The daughterboard may further comprise secondary processing functions for example safety and motor management functions. Advantageously, this may enable a common encoder PCB to be used in a modular manner with a plurality of alternate daughterboards. For example, a variety of motors with different functionality could be specified by provided by selecting from one of several daughterboards. It may be appreciated that such flexible configuration may be particularly attractive when mass producing motors with a range of possible applications.

A further aspect of the invention provides an interior permanent magnet electric machine rotor assembly comprising an integrally cast shaft and hub, the hub comprising over-cast iron and a plurality of circumferentially distributed slots for permanent magnets.

The integrally cast shaft and hub may be an aluminium casting. The integrally cast shaft and hub may be cast and machined to provide a required finish. The aluminium casting may for example be over-cast onto the iron which forms the ferro-magnetic part of the rotor (which provides the magnetic function of the rotor in conjunction with the permanent magnets received in the slots). The iron may for example be a laminated steel stack. The plurality of circumferentially distributed slots for permanent magnets may be formed in the over cast iron portion of the rotor.

Advantageously, embodiments of the invention may provide a rotor assembly which can be balanced during initial casting and machining process steps. As such, the rotor may require only minor subsequent adjustments when installing the permanent magnets are inserted (for example, prior to final assembly of the electric machine). This may simplify and streamline rotor manufacturing.

In embodiments the hub further comprises a plurality of integral targets for a rotary encoder. Electric machines may include an encoder to monitor the position and/or movement of the rotor relative to the stator. A plurality of targets on the rotor may form a coding for the rotary encoder. In use, rotation of the rotor causes the targets move into (and out of) alignment with a sensor arrangement of the encoder. The targets may be formed of a magnetic material (for example a ferromagnetic material of the rotor) such that they can be detected by induced currents in a circuit printed on a PCB board of the encoder.

The targets may be cast features of the hub. The targets may be circumferentially distributed around axial end face the hub. The targets may comprise a plurality of castellations. Providing an integral targets may reduce the need for an additional component (and therefore reduce the overall part count) and simplify the assembly of the electric machine. Further, an integrally formed target requires may remove the need for an additional alignment or calibration when assembling the rotary encoder of the electric machine.

In some embodiments the rotor may further comprise a cooling passageway disposed between the integrally cast shaft and hub. Thus, the cooling feature may be integrally formed in the rotor. The cooling passageway may comprise an array of passageways for example an annular array each separated by support spokes. The support spokes may extend substantially radially. The, or each, cooling passageway may be a through passageway, for example the passageway(s) may extending between first and second axial faces on opposing sides of the hub. The, or each cooling passageway may extend generally axially through the rotor The, or each, passageway may comprise an inlet on one axial face and an outlet on the other axial face. The outlet may be radially outward of the inlet such that coolant flow through the passageway is induced during rotation of the rotor. For example centrifugal flow will occur during rotation of the rotor. Advantageously, such an induced coolant flow may both help to cool the rotor via the passageway and also encourage coolant flow around the electric machine outside of the passageway.

The, or each, passageway may have a divergent cross-sectional profile. For example, the, or each passageway may diverge (for example radially) along its axial length. Thus, the passageway may provide a nozzle effect to accelerate coolant flow therethrough.

The over-cast iron may comprise a lamination stack. The plurality of circumferentially distributed slots may be formed in the lamination stack.

In embodiments the rotor may be pre-balanced prior to installation of a plurality of magnets.

The rotor assembly may further comprise a plurality of permanent magnet. Each permanent magnet of the plurality may be mounted in one of the plurality of circumferentially distributed slots.

According to a further aspect of the invention there is provided an electric machine comprising a stator assembly and a rotor assembly in accordance with embodiments.

In another aspect of the invention there is provided a method of manufacturing an interior permanent magnet electric machine rotor assembly, the method comprising: providing a lamination stack; over-casting an integral shaft and hub; balancing the rotor assembly; and mounting a plurality of permanent magnets in the rotor assembly.

A further aspect of the invention comprises a method of assembling a stator, the method comprising the steps of: providing a stator core comprising an articulated array of pole teeth in an open linear configuration, each pole tooth comprising a deformable pole tip; positioning a bobbin carrying a coil over each pole tooth; deflecting the pole tips of each pole tooth into a transverse position over the bobbin; and rolling the core into a closed annular array; wherein the inner end of each pole tip is latched by a seat on the pole tooth and the outer end of each pole tooth is latched by the bobbin.

Another aspect of the invention comprises a method of assembling a stator, the method comprising the steps of: providing a stator core comprising an articulated array of pole teeth in an open linear configuration; providing a coil winding on each pole tooth; rolling the stator core into a closed annular array; wherein rolling the stator core into a closed array comprises hinging interface surfaces formed in the footprint of each pole tooth into engagement.

A further aspect of the invention comprises a method of assembling a stator, the method comprising the steps of: providing a stator core comprising an articulated array of pole teeth in an open linear configuration; providing a coil winding on each pole tooth; rolling the stator core into a closed annular array; wherein rolling the stator core into a closed array comprises bringing opposing free ends of the stator core into abutment and engaging complementary engagement features provided on the ends to latch the stator core in a closed annular configuration.

A further aspect of the invention comprises a method of assembling an electric machine, the method comprising the steps of: providing a rotor assembly including an encoder coding; providing a stator assembly; providing an encoder PCB fixed relative to the stator, attaching a cover to the stator assembly, the cover enclosing the encoder and attaching a controller to the encoder PCB from the exterior of the cover.

The method may include attaching the encoder PCB to an internal side of the cover prior to attaching the cover to the stator assembly.

The method may further comprise providing an arm on the encoder PCB, the arm carrying a temperature sensor and wherein fixing the encoder PCB relative to the stator assembly positions the temperature sensor relative to one of a plurality of stator coils.

A further aspect of the invention comprises a method of assembling a stator, the method comprising the steps of: providing a core comprising an articulated array of pole teeth in an open linear configuration, positioning a bobbin carrying a coil over each pole tooth; and rolling the core into a closed annular array; and wherein the step of positioning a bobbin comprises deploying a resilient flange member by engagement with the pole tooth.

In embodiments each pole tooth comprises a deformable pole tip and the method further comprises deflecting the pole tips of each pole tooth into a transverse position over the bobbin. The method may further comprise an outer end of each pole tooth being latched by the bobbin.

The method may be used in conjunction with the embodiments described above.

Whilst the invention has been described above, it extends to any inventive combination of the features set out above or in the following description or drawings.

DESCRIPTION OF THE DRAWINGS

Embodiments of the invention may be performed in various ways, and embodiments thereof will now be described by way of example only, reference being made to the accompanying drawings, in which.

DETAIL DESCRIPTION OF EMBODIMENTS

It may be noted that directional/orientational terms such as radial, circumferential and axial may be used herein to refer to the general directions of the assembly or components thereof relative to their in-use configuration. The general directions are shown, by way of example only, by arrow R showing a radial direction, C showing a circumferential direction and A showing an axial direction in FIG. 1. However, the skilled person will appreciate that (unless expressly indicated otherwise) such directions are used broadly and do not imply strict mathematical conformance with a particular orientation. Likewise, the use of such terminology does not exclude a component or feature having a non-circular or irregular form.

Figure 1A:
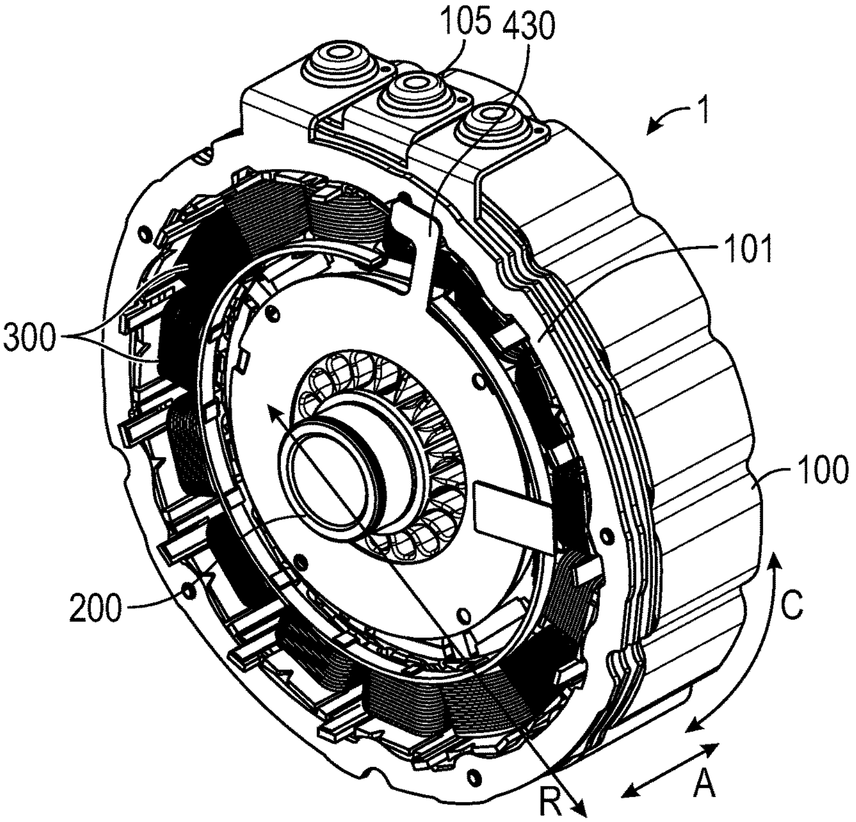
FIGS. 1A and 1B show an electrical machine in accordance with an embodiment.
Figure 1B:
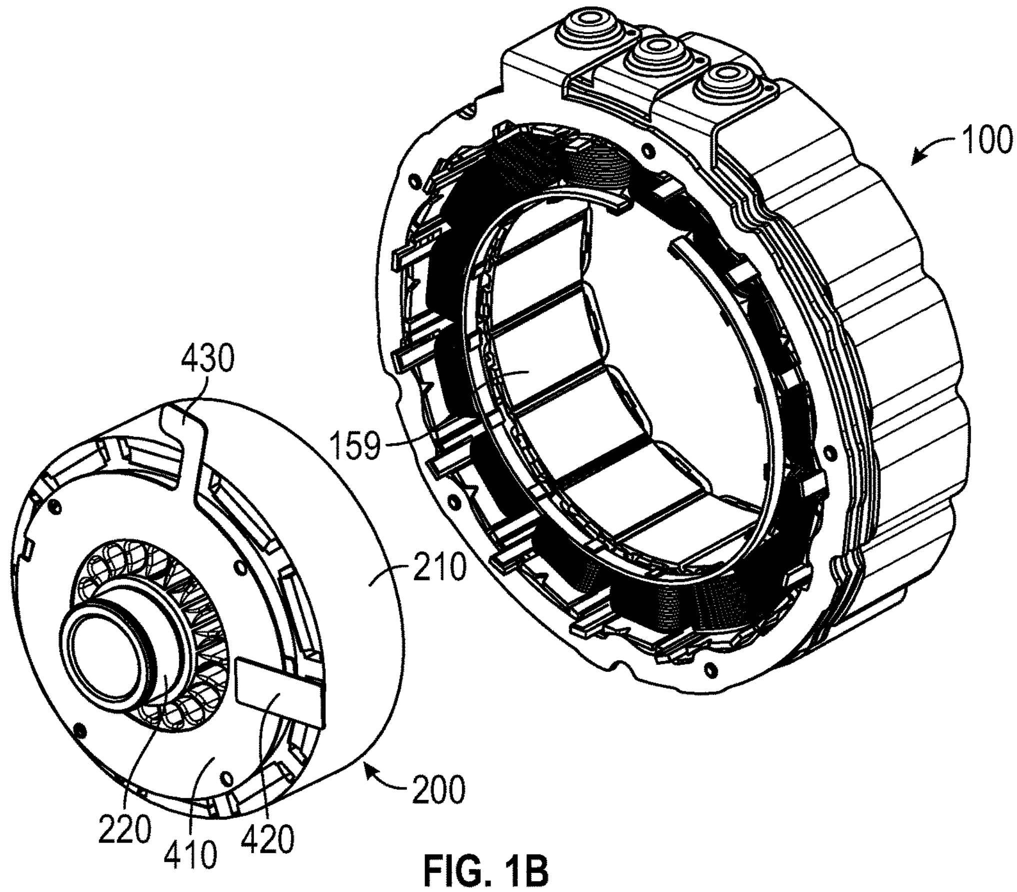

An electric machine 1 is shown in FIGS. 1A and 1B (in which the stator is shown in exploded relationship) and comprises a stator 100 surrounding a rotor 200. The stator comprises a stator core 110 and a plurality of coils 300 mounted on poles of the stator core 110. The stator assembly is completed by electrically connecting the coils via bus bars 101 to connectors 105.

Figure 2:
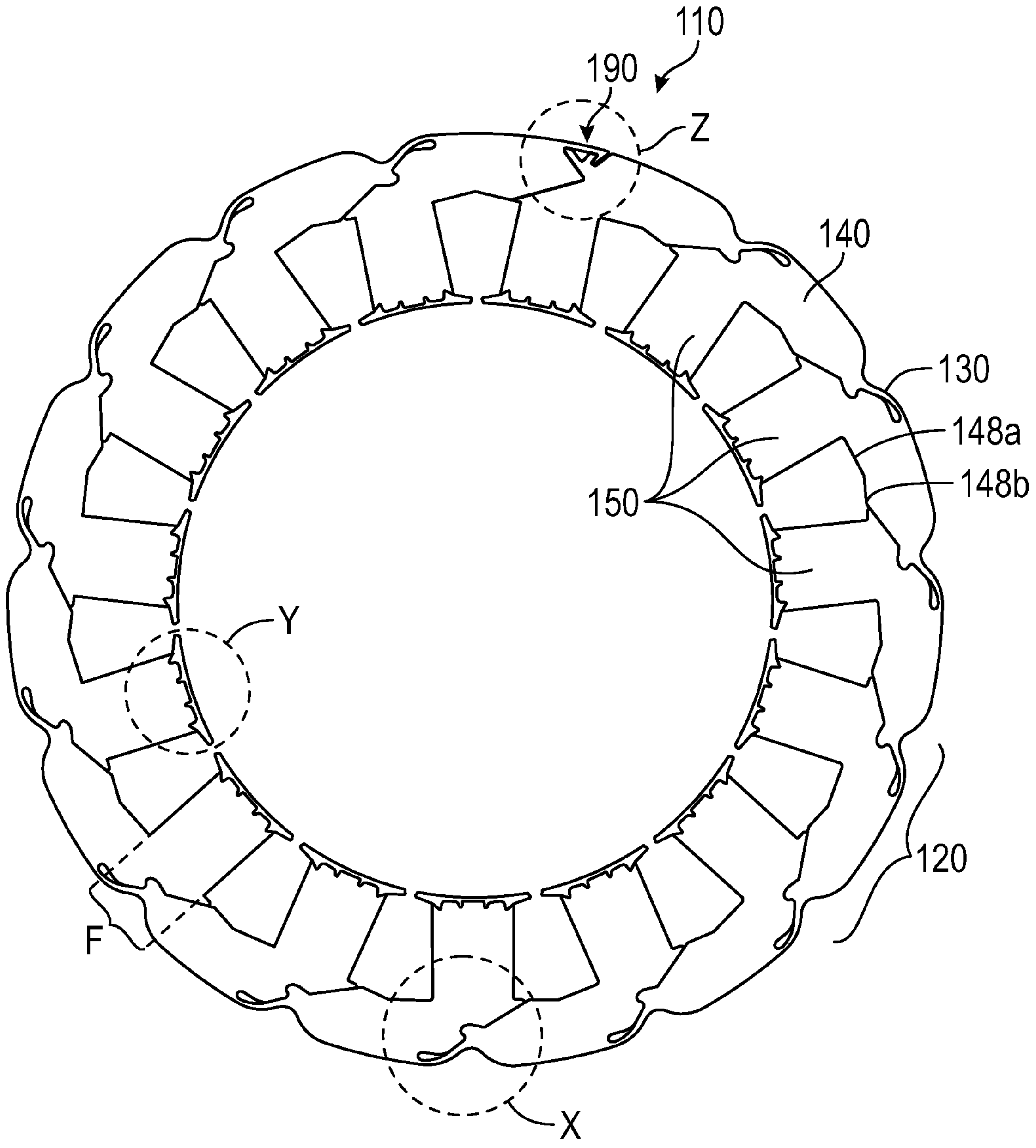
FIG. 2 shows an end view of the stator core in a closed configuration in accordance with an embodiment.
Figure 3A:
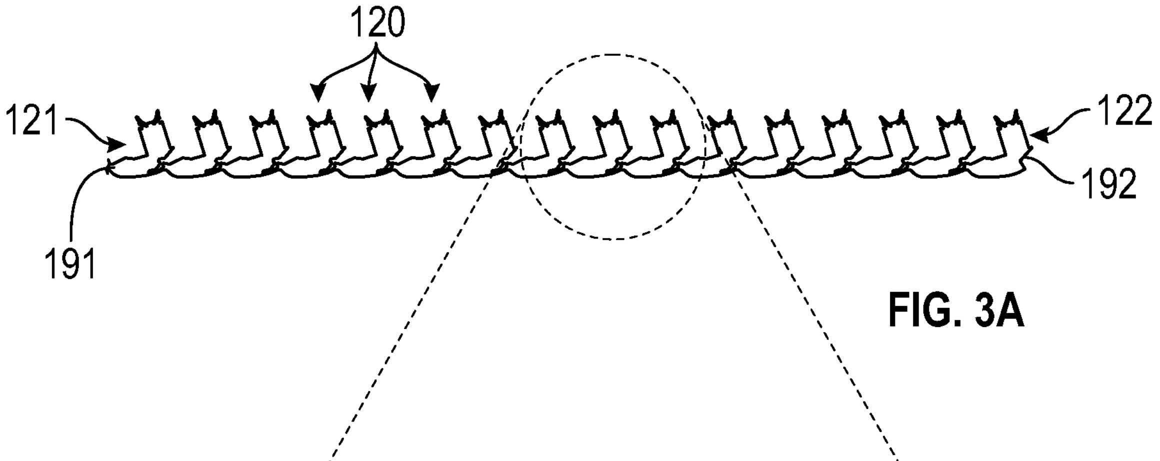
FIGS. 3A and 3B show a views of the stator core of an embodiment in an open configuration and a close up section of the open stator core.
Figure 3B:
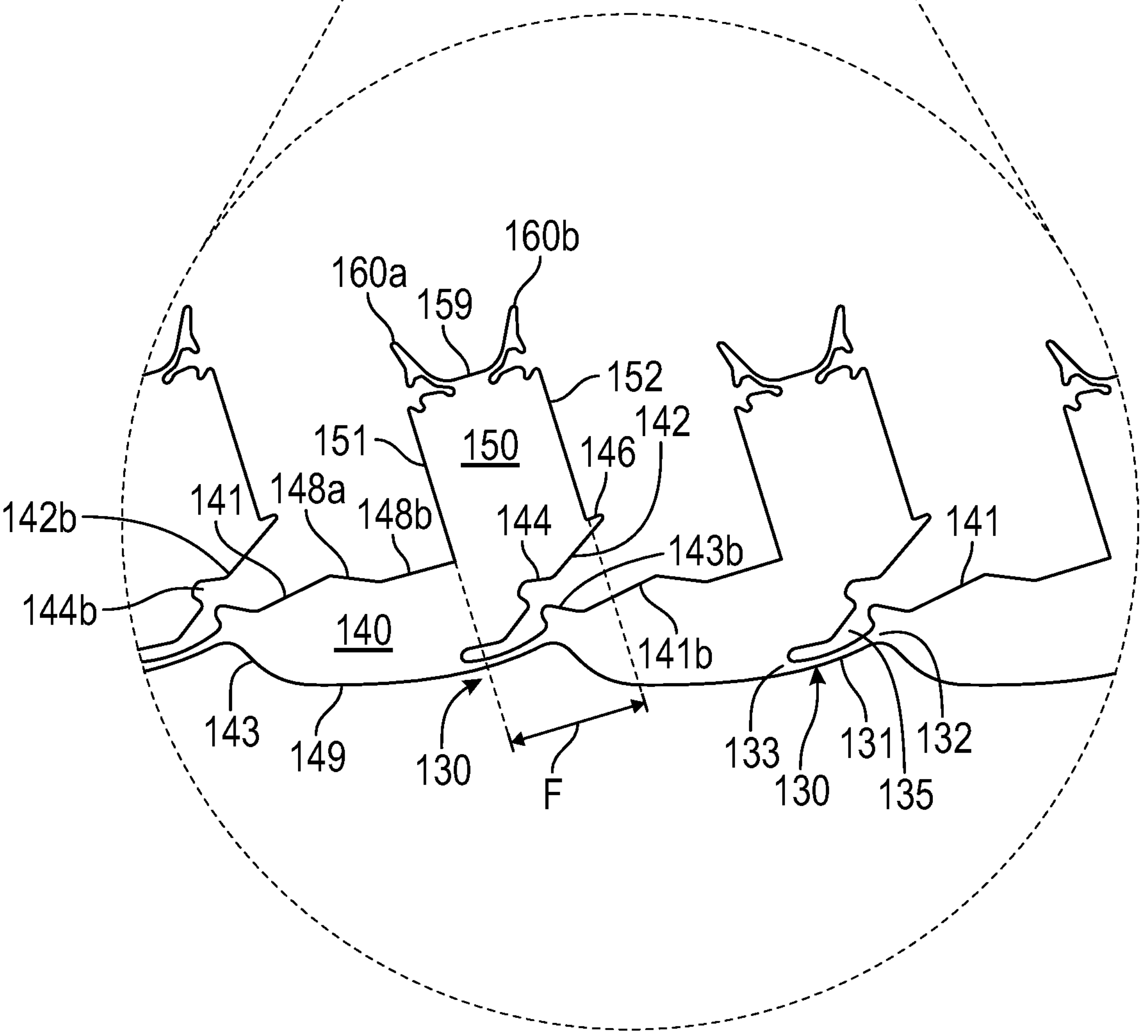

The stator core 110 in accordance with an embodiment is shown in FIG. 2. As will be known in the art, the stator core 110 may be formed from metal laminations which are stamped into the required shape. The stator core 110 is formed from a plurality of individual core segments 120. Each core segment 120 comprises a body 140, which defines a portion of the annular ring of the stator core 110, and a pole tooth 150 which projects radially inwardly from the annular ring defined by the bodies 140. The body 140 and tooth 150 of each segment form a generally L-shaped configuration (in contrast to typical prior art arrangements which form a generally T-shaped configuration). Adjacent core segments 120 are connected by a hinge connection 130 such that the array of segments can be stamped as a single open array (as shown in FIG. 3) before being deformed into the closed annular shape shown in FIG. 2. The shape and features of the stator core will be described further below with reference to the detailed view of FIG. 3*a*, the detail of region X shown in FIG. 4, the tooth tip details of region Y shown in FIG. 5 and the connector arrangement of area Z shown in FIG. 6.

As noted above, FIG. 3 shows the array of stator core segments 120 in an open configuration. Typically the open configuration may configure the segments 120 in a linear array (which can be advantageous in automated manufacture). The stator core 110 may be initially stamped in this open configuration. In the illustrated embodiment the stator core 110 comprises fifteen substantially identical segments 120 (but it will be appreciated that an appropriate number may be selected depending upon the design of the electric machine—for example based upon the number of poles and coils required). The segments 121 and 122 at the respective opposite ends of the array of segments are each connected to a single adjacent segment and have a free end face 191, 192 provided with respective complementary interconnecting features (explained further below with reference to FIG. 6). The intermediate segments 120 are each connected on both sides to an adjacent segment (having an identical profile) by hinge connectors 130.

Figure 4:
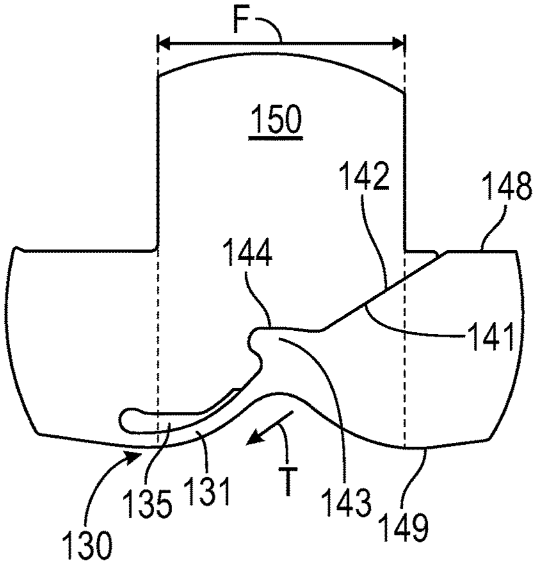
FIG. 4 shows a detailed view of the stator core hinge interface of an embodiment.

The features of an individual segment 120 will now be described with reference to the enlarged detail shown in the lower portion of FIG. 3 and the enlarged detail of FIG. 4. As noted above, each segment 120 has a generally L-shaped configuration defined by the body portion 140 and a single pole tooth 150. The body 140 is a segment of an annular ring and having a radially outer circumferential surface 149 and a radially inner circumferential surface 148. To aid positioning of the coils 300 the inner surface 148 may be defined by tangential sections 148*a* and 148*b* (best seen in FIG. 1) that generally approximate a continuous circular profile.

Figure 7A:
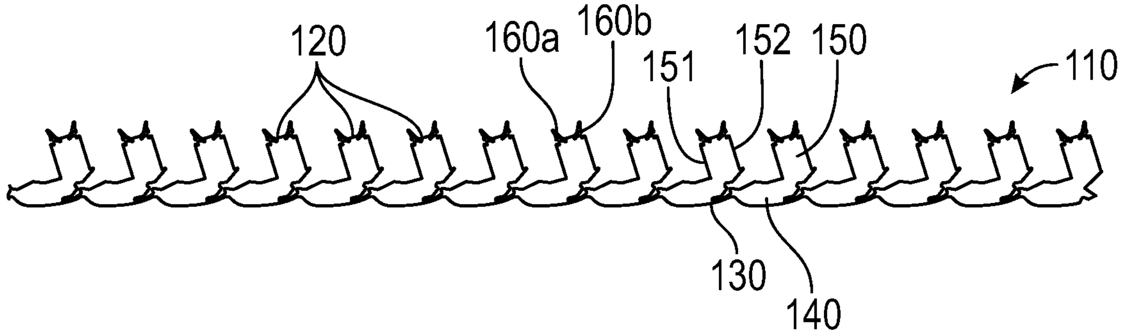
FIG. 7A to 7C illustrate the method of assembling a stator in accordance with an embodiment.
Figure 7B:
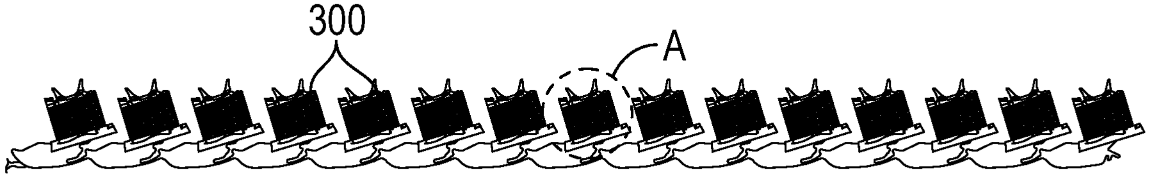

The pole tooth 150 extends radially away from the body 140 and has a transverse width defined by two circumferentially spaced apart sides 151 and 152. A footprint F of the pole tooth 150 may be defined in the body 140 as the region between the spaced apart side 151 and 152 of the pole tooth 150. In other words, the footprint F of the pole tooth 150 is the area of the body 140 which underlies the pole tooth. The distal end 159 includes a pair of tooth tips 160*a*, 160*b* (described in further detail below) which have an initial, stamped, configuration (as shown in FIGS. 3 and 7A and 7B) in which they extend generally radially and a final assembled configuration (as shown for example in FIGS. 2 and 7C) in which they extend generally circumferentially. In the assembled configuration the pole teeth 160 extend transversely relative to the pole tooth 150 to provide a flange at the pole tooth end 159.

The circumferentially spaced apart ends 141 and 142 of the body 140 are provided with first and second complementary interface surfaces 141 and 142. The first interface surface 141 is arranged at an oblique angle to the radial direction and tapers circumferentially away from the body portion 140 of the segment 120 as it extends from the inner surface 148 to the outer surface 149. The second interface surface 142 is arranged at a corresponding oblique angle to the radial direction and tapers circumferentially towards the body portion 140 of the segment 120 as it extends from the inner surface 148 to the outer surface 149. The second interface 142 commences at a small flange 146 which extends away from the foot of the side wall 152 and forms part of the inner face 148 of the body. The surface 142 then extends back through substantially the full width of footprint F of the pole tooth.

In the open/linear configuration (as shown in FIG. 3) adjacent interface surfaces 141, 142*b* and 142, 141*b* of neighbouring segments 120 are in a spaced apart opposed arrangement. When the stator core 110 is in the closed configuration (as shown in FIGS. 2 and 4) the complementary interface surfaces match and abut the other complementary surface 142*b* and 141*b* of the adjacent segment. Thus, it can be appreciated that embodiments ensure that the joining line between adjacent segments of the stator extends at an angle (oblique relative to both the radial and circumferential directions) through the footprint of each pole tooth 150. The applicant has found that positioning the joining line between segments in the footprint of the pole tooth provides both structural and magnetic field advantages in the final stator 110. Further, the resulting L-shape of the segments 120 (rather than a T-shape as in prior arrangements) may provide advantages in enabling clearer access to the pole tooth 150 to provide a coil 300 thereon when assembling or manufacturing the stator.

The interface surfaces 141, 142 have matching profiles and are also provided with inter-engagement features 143, 144. The inter-engagement features ensure that adjacent segments positively align into a pre-determined location when brought together. In the illustrated embodiments the inter-engagement features comprise a rib or protrusion 143 on the first surface 141 and a corresponding recess 144 on the second surface 142. It may be noted that the rib 143 is provided with a rounded nose (and recess 144 has a corresponding profile) which may help to cam the inter-engagement features into alignment during roll up of the stator 100.

At the outer surface 149 of the body 140 the interface surfaces end at a hinge 130 which adjoins the core segments 120.

Each hinge 130 is arranged as a living hinge with a web 131 extending generally circumferentially along a section of the outer surface 149 of the body 140. The web 131 extends from a first end 132 which is integral with the first end 141 of a segment to a second end 133 which is integral with the second end 142 of the neighbouring segment 120. The web 131 is separated from the body 140 of the segment by a slot 135. The slot 135 and the web 131 both extend in longitudinally in a direction which is generally circumferentially aligned. When the stator core 110 is in the open configuration, one circumferential end of the slot 135 is closed (with a rounded curvature to allow bending without stress concentration) and the other end terminates in an open mouth which is contiguous with the spacing between the opposed adjacent sides 141 and 142 of adjacent segments.

The hinge 130 has a natural resilience as a result of its metal material and having been stamped in the open configuration. As seen in FIG. 4, when the stator body segments 120 are moved to the closed/annular configuration with the interface surfaces 141, 142 abutting the web 131 of the hinge 130 is elastically folded down against the body 140 of the stator core. In this configuration the web 131 may function as a leaf spring and provides a tension in the direction of arrow T. This tensile force acts to urge the engagement features 143 and 144 into position to firmly secure and align the segments 120.

Figure 5A:
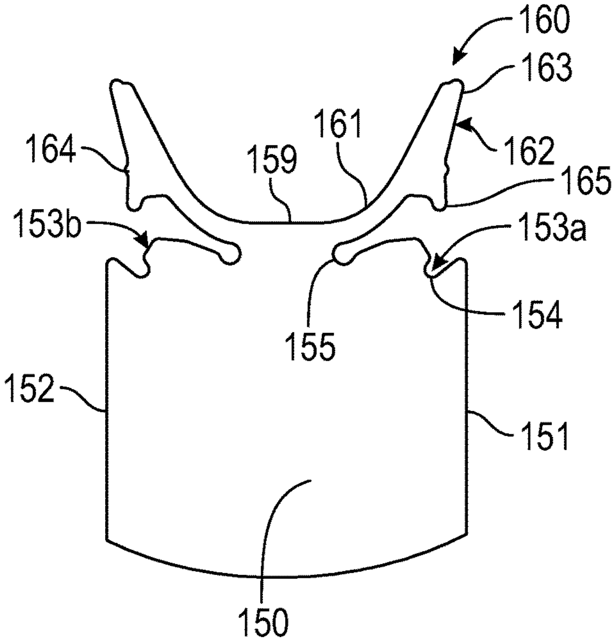
FIGS. 5A and 5B show the tooth tips of the stator core of an embodiment in two configurations.
Figure 5B:
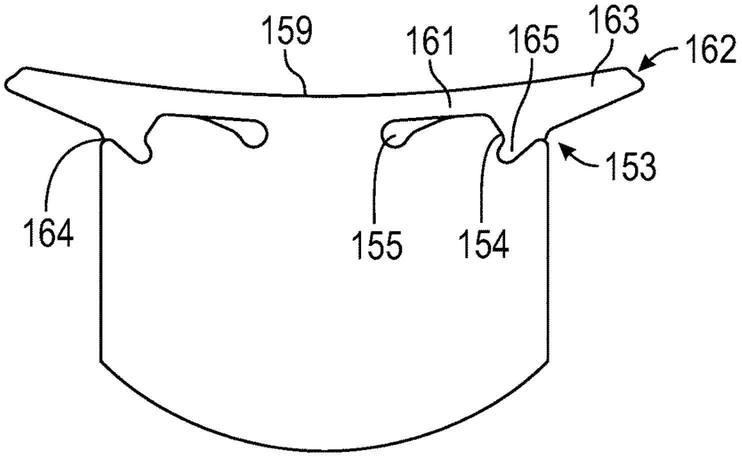

The pole tips 160 are shown in further detail in FIG. 5. In the initial configuration shown in FIG. 5A the pole tips 160 project longitudinally from the end of the pole tooth 150 such that they are radially directed. In the deformed, in use, configuration shown in FIG. 5B the pole tips 160 project transversely from the sides of the pole tooth 150 to provide a flange at the end of the pole tooth 150, as such in this configuration the pole tips are circumferentially aligned. Each tooth tip 160 comprises a narrow web portion 161 which is contiguous with the end 159 of the pole tooth 150. The web portion extends into an enlarged head 162 at the distal end of the web 161. The head 162 has a wedge or arrow-shaped profile which tapers in thickness distally from a proximal portion 165 to a distal portion 163. The proximal portion 165 has a barb shape (which is described further below). An alignment feature 164 such as a notch may also be defined in the lower surface of the head 163.

The pole tooth 150 has a pair of seats 153*a* 153*b* adjacent to the respective pole tips 160*a* and 160*b*. The seats 153 are positioned at the shoulder of the pole tooth where the side walls one 151 and 152 meet the distal end 159 of the pole tooth 150. The seat includes an undercut portion 154 which provides a latch feature for engagement by the pole tip head 162. The seat 153 is contiguous with a slot 155 separating the web 161 from the pole tooth 150 and ends at a radiused corner to enable bending of the web without a stress concentration at the apex of the slot 155.

When the stator 110 is assembled the pole tips 160 are deformed to the transverse orientation of FIG. 5B and define a flange over a coil 300 positioned on the pole tooth 150. In this position the surface of the pole tooth end 159 and the outer surfaces of the two pole tips 160*a* 160*b* form a continuous surface (extending generally circumferentially—which may include a truly arcuate circumferential surface or a polygonal surface approximately transcribing a circumferential shape). It may be noted that the surface 59 of the pole teeth can be seen in the exploded view of a full electric machine 1 in FIG. 1B. In this assembled configuration the barb formed by the proximal end 165 of the head 162 latches into the undercut 154 of the shoulder seat 153. Thus, the pole tip 160 may be both aligned and positively engaged into position. This provides an arrangement which is both accurate and also robust for example providing a redundant connection between the pole tip 160 and pole tooth 150 which is not solely reliant upon the adjoining web 161 to hold the tip 160 in position (so may for example have increased resistance to damage or fatigue in use). The inner surface of the head 162 of the tooth tip 160 may also be provided with an alignment feature 164, which may be a notch or rib, to ensure accurate positioning of the head 162 in the seat 153. This may for example ensure that the alignment and length of the flange formed by the distal end 163 of the head 162 is accurately formed.

As noted above, the end segments 121 and 122 of the stator 110 may be provided with end faces 191, 192 with inter-engagement features. This may provide a stator core 110 which can be resiliently engaged in its closed annular configuration (as shown in FIG. 2) without the need for additional processing steps such as applying a bead of solder or welding. This may provide significant manufacturing efficiency advantages. Additionally or alternatively, the inter-engagement features may provide a stator core 120 which accurately self-aligns in the closed configuration.

Figure 6:
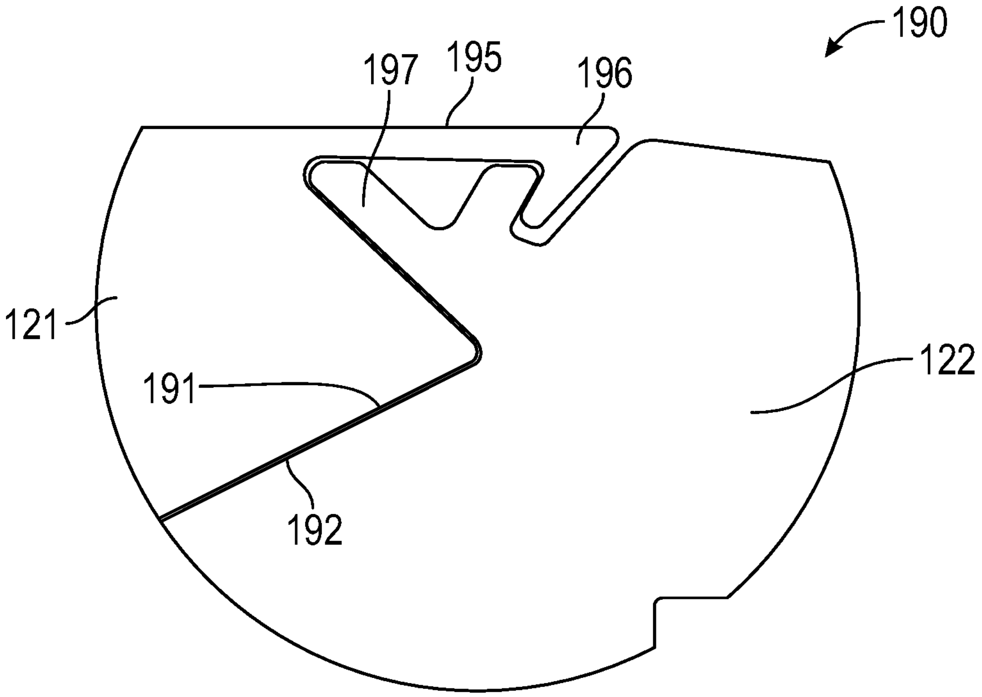
FIG. 6 shows a detail of the latching detail of the stator core of an embodiment.

The engagement features of the illustrated embodiments are shown in isolation FIG. 6. The end faces 191 and 192 of the end segments 121,122 have an interface which is generally similar to the interface 141, 142 between intermediate segments 120. In particular the alignment and position of the interface is similar with the end face 192 extending at an oblique angle through the footprint of the pole tooth of end segment 122. In place of the alignment feature 143, 144 and hinge 130 of the intermediate segments the end segments have complementary engagement features 196 and 197 formed on their respective end faces 191 and 192. A first one of the engagement features 197 comprises an arm 195 which extends along the general direction of outer surface 149 (for example it may be circumferentially extending or tangential to approximate the circumferential direction)) and carries a latch head 196. The latch head 196 projects inwardly from the arm 195 and has a barbed profile being angled back towards the end face 191. The corresponding feature of the other end 122 provides a recess 193 into which the latch head 196 is to be retained. The recess 193 extends radially inwardly away from the outer surface 149 and is angled to receive and retain the latch head 196. The recess 193 may be conveniently formed on a protruding arm 194 which extends outwardly from the surface 192 of end 122. The arm 194 may have a branched profile (with a Y-type shape) to provide features which the latch head 196 can pass over and engage. When the array is moved into its closed/annular configuration the surfaces 191 and 192 are brought into alignment and the latch head 196 will deflect, bending the arm 195 radially outwardly, to pass over the arm 194. Once the surfaces 192 and 194 come into full circumferential alignment the barb of the latch head 196 will be able to resiliently snap back (radially inwardly) from its deflected position into the recess 193 such that it is in the engaged position shown in FIG. 6. Once in this position the angle of the barbed latch head 196 and latch surface of the recess 193 ensure that the engagement features remain coupled.

Figure 8:
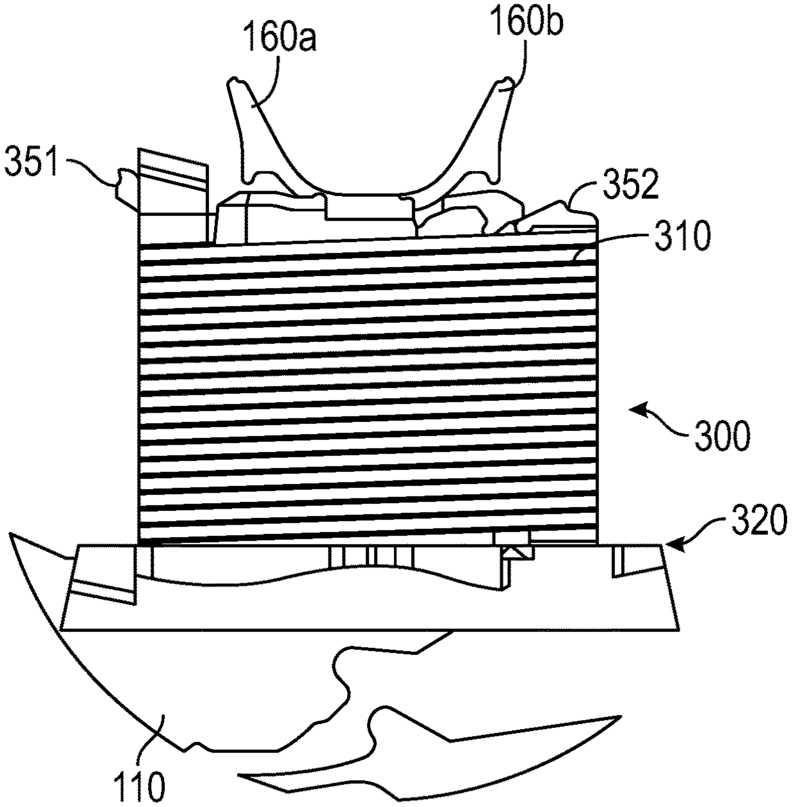
FIG. 8 shows a stator pole tooth and winding in accordance with an embodiment.

The provision of tooth tips 160 having an initial configuration in which they are longitudinally aligned aids assembly/manufacturing of the stator 100 as the coils 300 can be positioned over the pole tooth by being slid onto the tooth from the distal end 159 of the tooth 150. To further aid manufacture and assembly, embodiments of the invention further include a novel insulator bobbin 320 (referred to hereafter as "insulator" for conciseness) which will be described in further detail below with reference to FIGS. 8 to 10.

Figure 9A:
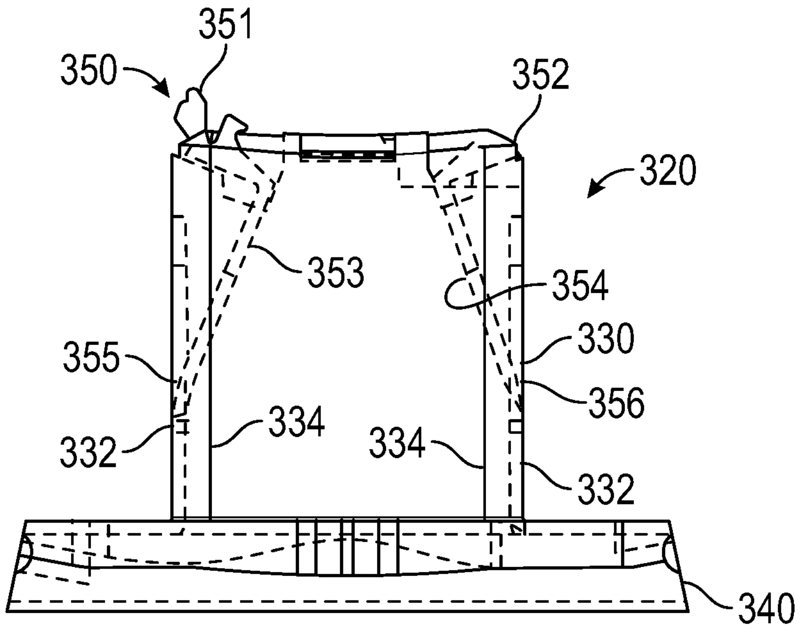
FIGS. 9A and 9B show the bobbin of the winding of an embodiment in isolation with the insulator respectively in pre-installation and post-installation configurations.
Figure 9B:
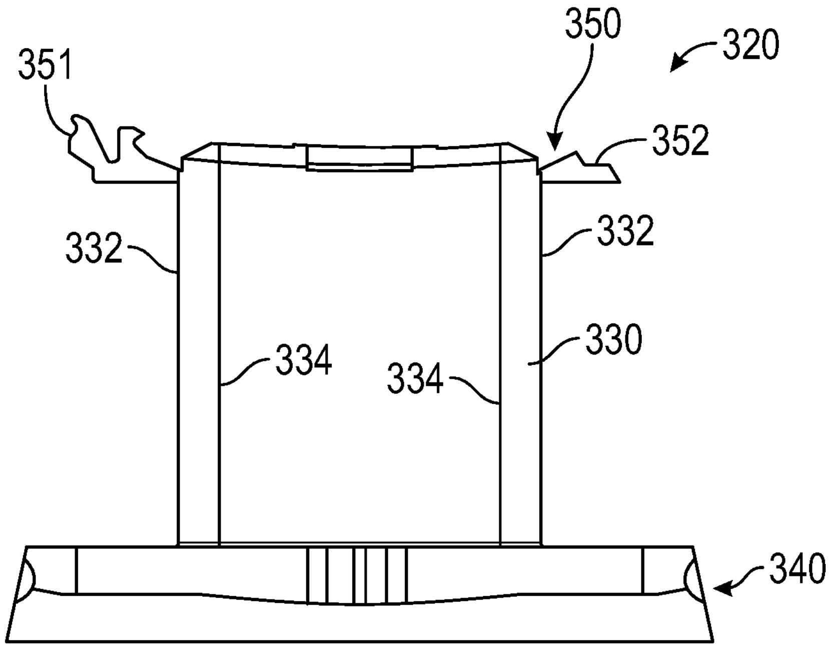

The insulator 320 is shown in isolation in FIG. 9, in which FIG. 9A shows the insulator 320 in an initial configuration and FIG. 9B shows the insulator 320 in an in-use configuration. The insulator 320 is formed from a single component plastic injection moulding. The insulator 320 is a bobbin comprising a sleeve 330 which surrounds the pole tooth 150 and receives a coil of copper wire 310 around its external surface 332. The sleeve internal profile closely matches the external profile of the pole tooth such that the inner surface of the sleeve 334 abuts the outer surface of the pole tooth 150. The size, shape and configuration of the insulator 320 and pole tooth 150 are matched and will depend upon the specification of the electric machine 1. The pole tooth 150 may typically have a rectangular cross section and thus the sleeve 330 may be a rectangular tube section.

The upper and lower longitudinal ends (which are radially spaced apart on the stator 100 when fitted to the pole tooth 150) each have a flange 340 and 350 which extends transversely from the sleeve 330 to provide protection and insulation between the coil 310 and the stator core 11—. The first flange 340 (which may be considered the internal flange as it is distal from the free end of the stator pole tooth 150) abuts the body 140 of the stator core 110 and provides an insulating and/or supportive skirt on the body. The flange 340 may sit on one of the tangential sections 148*a* and 148*b* of the inner circumferential surface 148 and will be proximal to the flange 340 of the adjacent pole tooth (as seen for example in FIG. 10). As explained further below, the second flange 350 (the outer flange as it is proximal to the free end of the stator pole tooth 150) may have outer tips which abut or engage the flange 350 of an insulator of an adjacent pole tooth in the assembled configuration. As such the end faces of the flange have first 358 and second 359 complementary interface surfaces at respective circumferentially opposing sides of the flange 350 of the insulator 320.

In accordance with embodiments, the flange 350 at the outer end of the insulator 300 is retractable. In the assembled view of FIG. 8 and the isolated view of FIG. 9B the flange 350 is shown in its deployed position. In the view of FIG. 9A the flange 350 is shown in its retracted position with hidden/internal features marked with broken lines.

The flange 350 is formed by a pair of flange members 351, 352 which are on opposing circumferential sides of the sleeve 330. Each flange member 351,352 is carried on a respective resilient arm 353, 354. The resilient arm 353, 354 extend longitudinally along the insulator 320 and are connected to the sleeve 330 of the insulator at an end 355, 356 distal from the member 351, 352. The arms 353,354 may for example be separated from the wall of the sleeve 320 by a longitudinal extending slit on either side of the arm. In the initial moulded position (as shown in FIG. 9A), the arms 353, 354 slant inwardly towards the interior of the sleeve such that the flange members 351 and 352 are biased inwardly towards one another. In the initial, retracted, position the flange members 351 and 352 are positioned such that no part of them protrudes beyond the outer surface of 332 of the sleeve 330. This enables the wire coil 310 to be easily positioned onto the sleeve 320 from the end having the retractable flange 350.

As the arms 353 and 354 are slanted inwardly they present a tapered surface on the interior of the insulator 320. When the insulator is slid onto a pole tooth 150 the spaced apart sides 151, 152 of the pole tooth 150 will engage the arms 353 and 354. This will gradually urge the arms 353, 354 outwardly and away from one another as the insulator 320 is moved longitudinally onto the pole tooth 150. This causes the flange members 351 and 352 to be automatically deployed to their final position when the insulator 320 is fully fitted to the pole tooth 150.

Figure 7C:
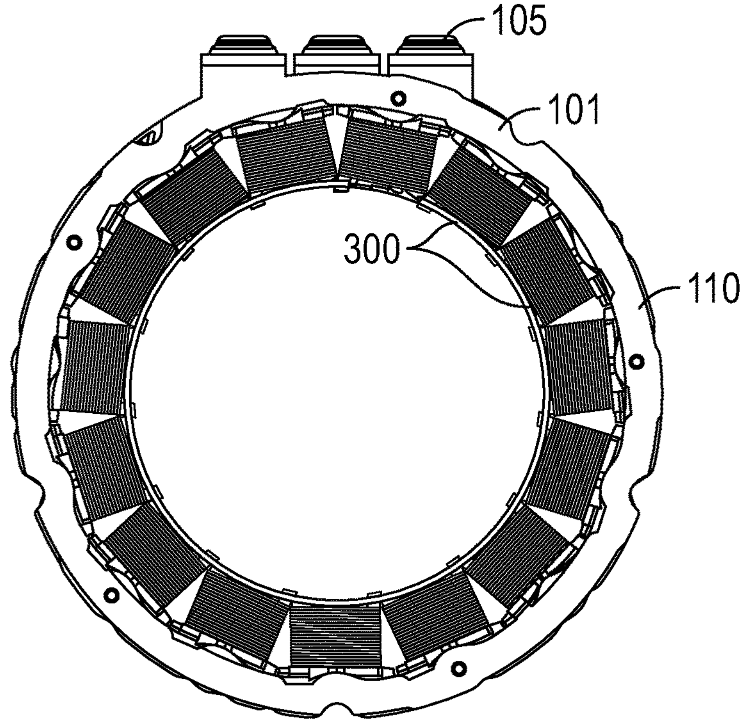

In embodiments the members 351, 352 of the flange 350 may also be adapted to engage the tooth tips 160 of the stator core 110 when in the assembled configuration. The steps of assembling a stator in accordance with an embodiment is shown in FIG. 7. A stator core 110 in the form of an articulated array of segments 120 each having a pole tooth 150 is provided in an open linear configuration as shown in FIG. 7A. Coils 300 are provided on each pole tooth, for example by sliding pre-wound insulator bobbins over each tooth in a linear manner as shown in FIG. 7B. Advantageously in order to automate assembly the coils may for example be provided in a jig such that all the coils may be aligned and positioned on the pole teeth as a group. The coils 300 are secured on the pole teeth by pressing the tooth tips into their transverse position. The stator core is then rolled into the closed array as shown in FIG. 7C. In rolling the stator core, each adjacent core segment 120 rotates into position about its hinge 130 and brings the surfaces 141 and 142 into abutment. As the end sections 122 and 121 are brought into position the latch head 196 engaging the recess 193 to hold the stator core in its closed configuration without the need for an additional processing step. The stator assembly can then be completed by electrically connecting the coils via bus bars 101 to connectors 105.

Figure 10:
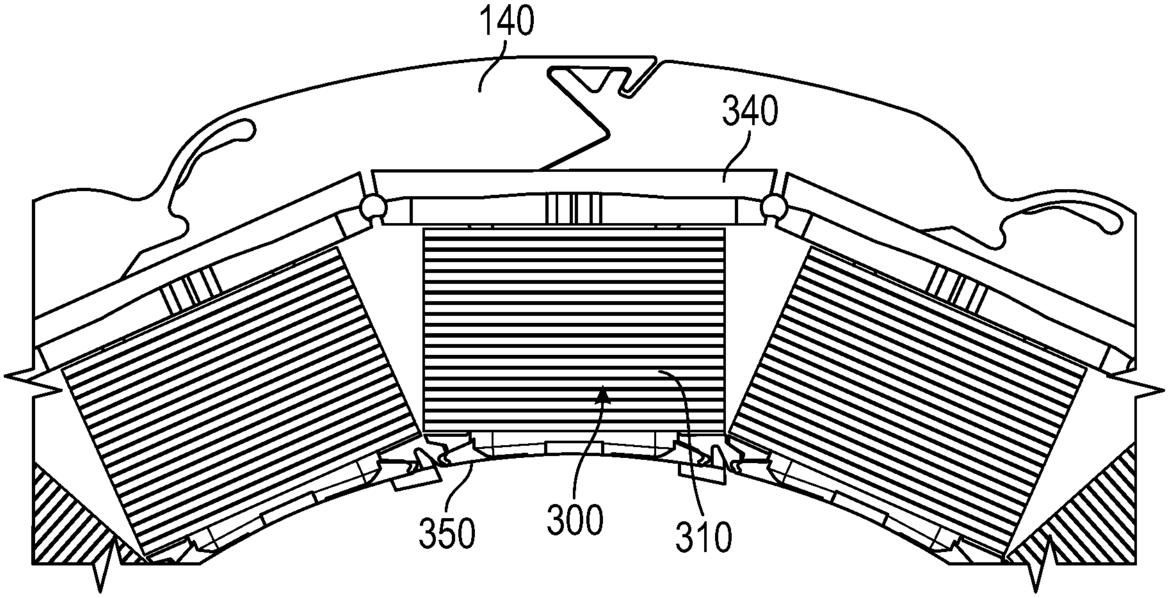
FIG. 10 shows a detail of the assembled stator according to an embodiment.
Figure 11:
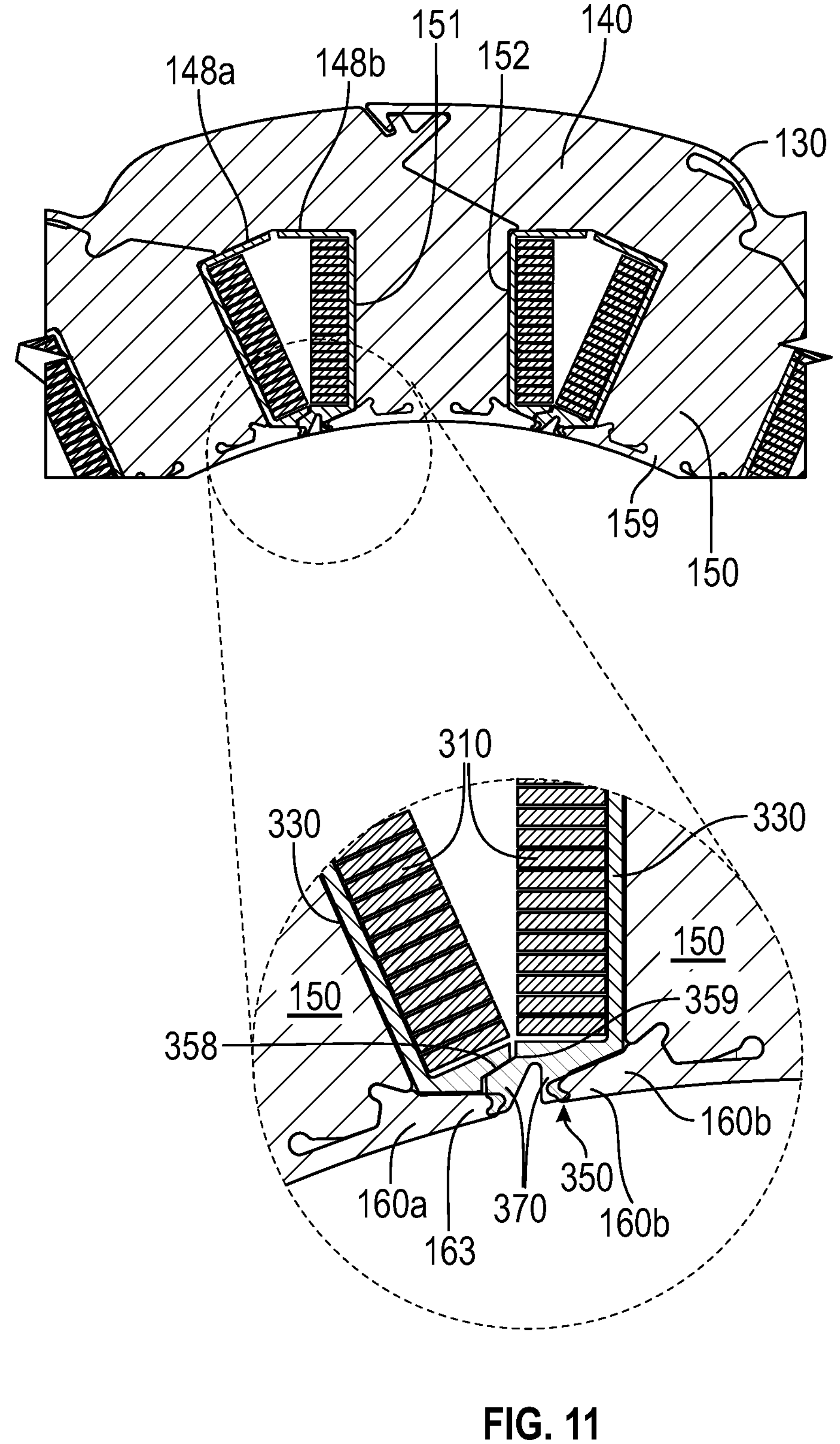
FIG. 11 shows a cross section and detail of the assembled stator of an embodiment

A detail of the stator assembly in the assembled configuration is shown in FIG. 10 in which it can be seen that the coil 310 is positioned on a stator pole tooth 150 (concealed on this figure) to with the first flange 340 against the stator core body 140 and the second flange 350 forming a generally continuous inner circumferential ring. The assembly is shown in cross section in FIG. 11 where it can be seen that the sleeve 330 insulates between the coil 310 and pole tooth 150. It can also be noted how the flange 340 of adjacent insulators 320 are positioned to abut the inner surfaces 148*a* and 148*b* of the body 140. The detailed section in FIG. 11 also shows how the ends of the flange members 351 and 352 have respective complementary interface surfaces 358 and 359 which abut and circumferentially overlap when the stator is in its annular configuration. The interface 358, 359 act to lock the insulator 320 into position in the assembled stator 100. Specifically, each insulator 320 is abutting and effectively interlocks with an insulator 320 of an adjacent pole tooth 150.

The insulator 320 is also adapted to resiliently engage the ends of the distal portion 163 of the pole tips tip 160. The resilient engagement may for example be a snap fit feature which deflects over the tips 160 when they are moved to their final deflected position. In the embodiment of the figures this is provided by defining a pair of opposed jaws 370 in the overlying portion of the flange member 352. The ends of the pole tips 160 are urged into engagement with the jaws 370 when the stator pole tips 160 are moved into their final deflected position. The jaws 370 can resiliently deflect so as to be squeezed together before snapping back over the ends of the pole tips 160. This arrangement ensures that both the proximal and distal ends of each pole tip 160 are retained in position in the assembled stator 100. Thus, it will be appreciated that the stator may have increased resistance to failure of a pole tip 160 for example as a result of fatigue over the lifetime of the electric machine.

Figure 22A:
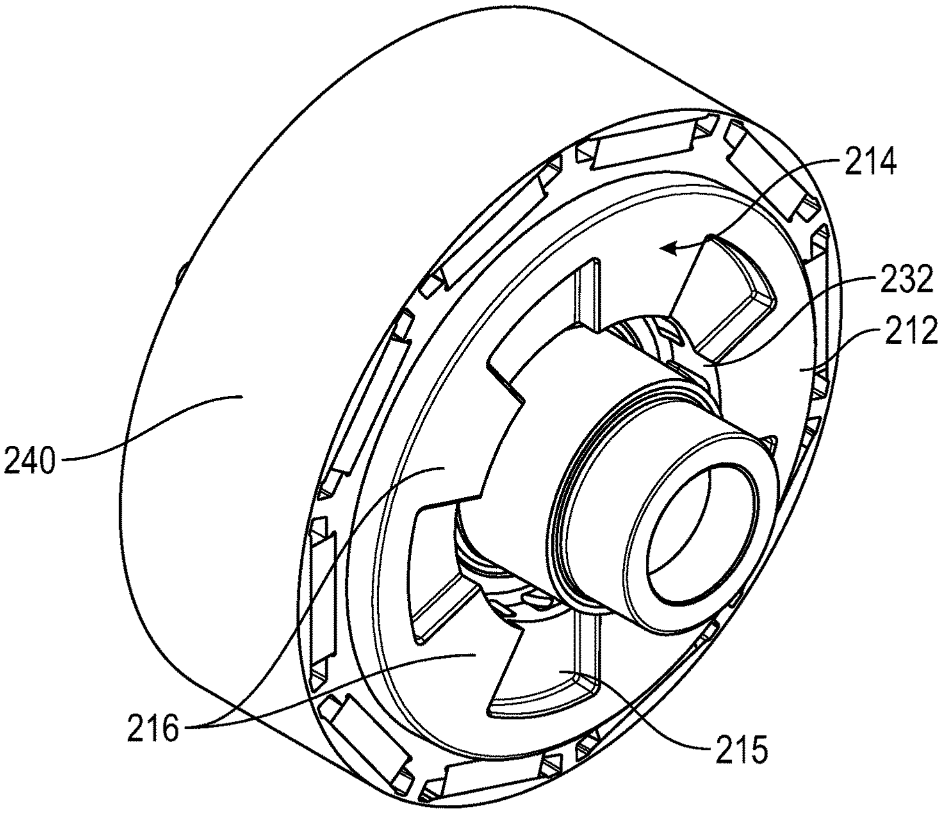
FIGS. 22A and 22B shows a perspective and end view of the rotor of an embodiment from a second axial direction.
Figure 22B:
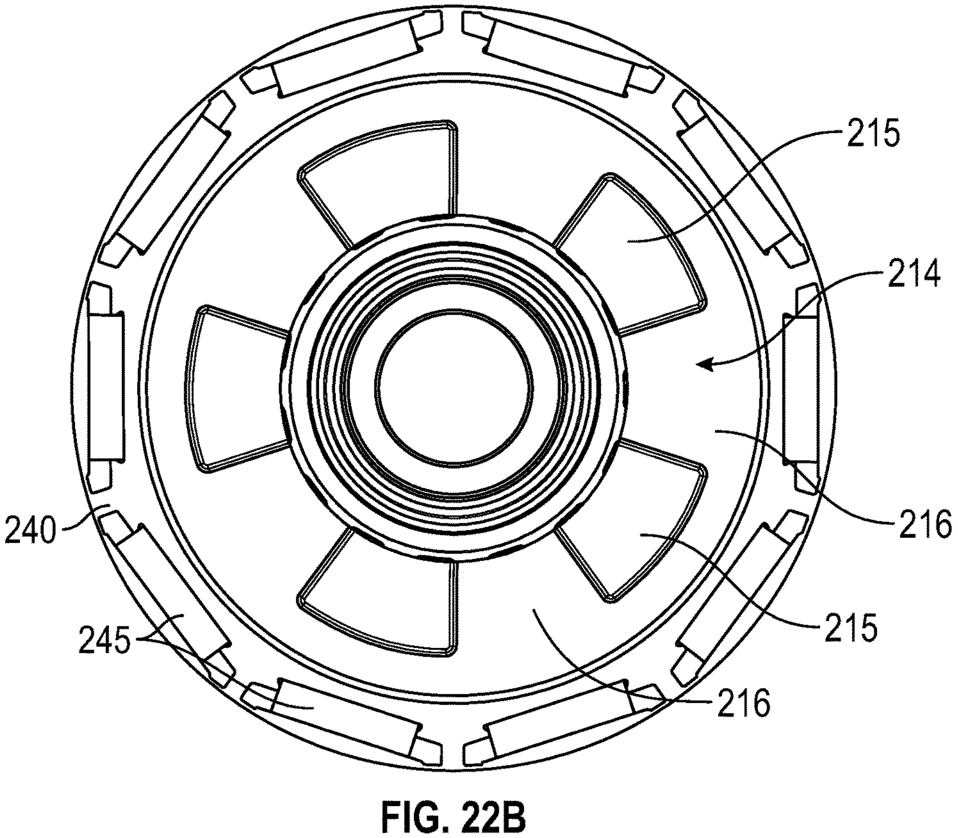

FIG. 22 illustrates a partially exploded view of a rotor assembly 200 in accordance with an embodiment. The rotor assembly comprises a hub 210 and axle 220 which are an integrally formed body. The hub 210 and axle 220 are cast and machined to provide a high tolerance integral component. The axle 220 has a hollow bore 222. As best seen in FIG. 4, at either axial end of the rotor assembly the shaft 220 is provided with a seat 224 and 225 for front and back bearings (not shown) such that the rotor assembly can be supported rotationally with respect to the stator 100.

The outer portion of the rotor assembly 200 comprises a lamination stack 240 which includes a plurality (in this embodiment ten) slots 245 each of which receives a permanent magnet 250. The lamination stack 240 may be cast into the integrated hub 210 and axle 220 to reduce the effective part count and number of subsequent manufacturing steps. This may also ensure that the rotor assembly can be prebalanced when machining the hub/axle casting so that only minimal minor adjustment balancing of the assembly is required once the magnets are installed (for example during final assembly of the electric machine).

Figure 23A:
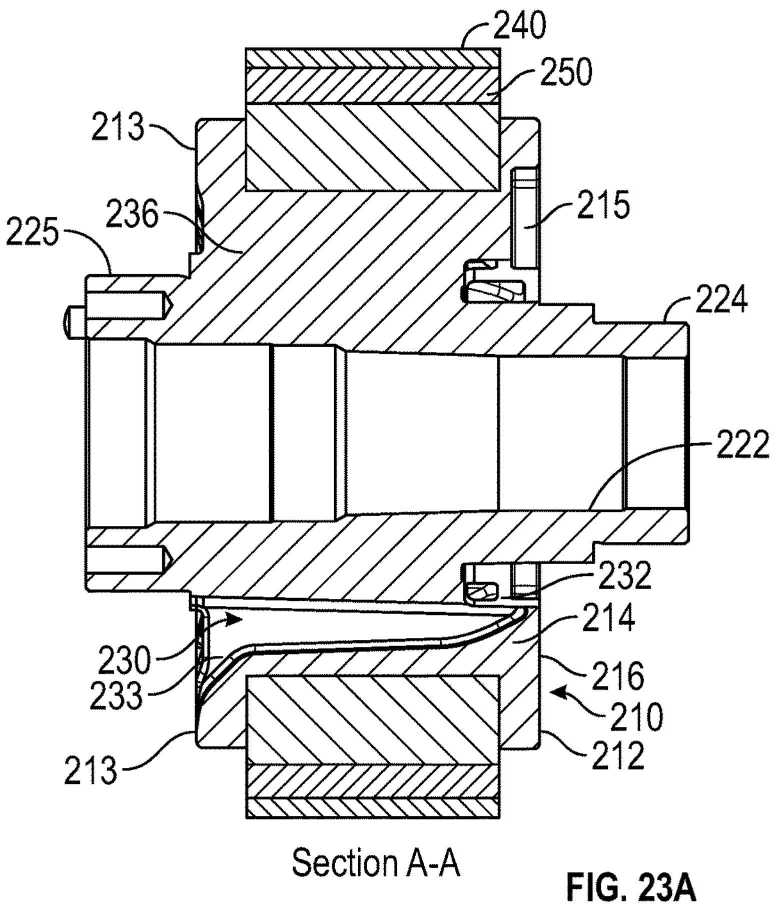
FIGS. 23A and 23B shows a side view and cross-section of the rotor of an embodiment.
Figure 23B:
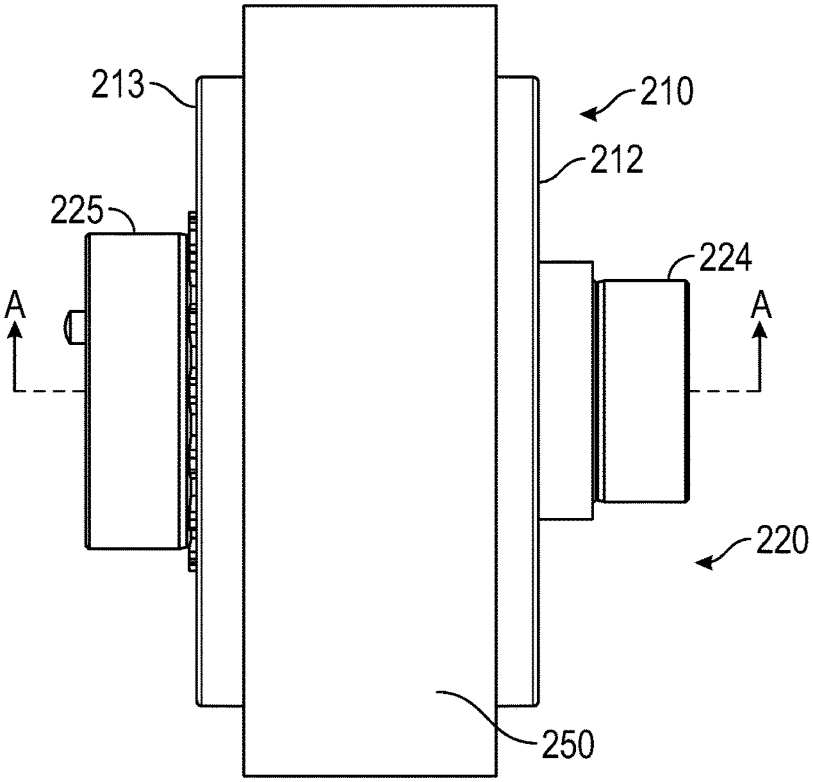

With particular reference to the axial end views of FIG. 23, it may be noted that one end face 212 of the hub 210 is formed with cast-in targets 214 for a rotary encoder 400. The targets 214 comprises an annular castellated array defined by a plurality of axial recesses 215 separating a series of lands 216 formed in the end face 212. The lands 212 of the targets 214 provide a mass of magnetic material which can be detected by inductive features of the PCB board 410 which is positioned in close proximity to the end face 212 and fixed relative to the stator 100. Thus, as the rotor 200 rotates within the stator 100 the lands 212 of the targets 214 are detected moving past the inductive features of the PCB board 410 and can be used to determine the position and/or rotational speed of the rotor 200.

The rotor casting is also provided with integrated cooling features in the form of a cooling passageway 230 disposed between the hub 210 and shaft 220. The cooling passageway 230 generally extends annularly around the full circumference of the rotor 200. The cooling passageway also extends axially through the full axial depth of the hub 210 of the rotor 200. As such, the passageway extends from a first opening 232 at the first axial end face 212 of the rotor hub 210 to a second opening 233 at the second (opposing) axial end face 213 of the rotor hub 210. The passageway 230 may be formed of a plurality of individual passageways (for example passageways 235*a*, 235*b*) distributed circumferentially around the rotor 200. The individual passageways may be independent or may be interconnected and may, for example, converge into a common annular mouth at one or both of the openings 232, 233 at the end faces 212, 213. A plurality of spoke members 236 may provide support from the shaft 220 to the hub 210 through the cooling passageway 230 (the spoke members 236 providing radial walls between adjacent individual passageways 235). The series of spoke members 236 may be generally radially extending and may be circumferentially distributed.

As best seen in the cross section of FIG. 24, as the passageway 230 extends axially through the rotor 200 from the first end face 212 to the second end face 213 it is progresses radially outwardly. As such, the opening 233 in the second end face 213 is radially outward of the opening 232 in the first end face 212. Additionally, the passageway is divergent as it progresses axially (in the same direction from the first opening 232 to the second opening 233). In use, the shape and profile of the passageway 230 causes a centrifugal pump effect upon cooling fluid (for example air) surrounding the rotor 200). Cooling fluid will be drawn into the first opening 232 of the passageway and ejected from the second opening 233. This will not only assist in cooling of the rotor 200 (by thermal interaction with the flow through the passageway) but may also encourage the establishment of an effective coolant flow around the interior of the electric machine 1 (so may, for example, also assist in cooling of the stator 100).

Figure 14:
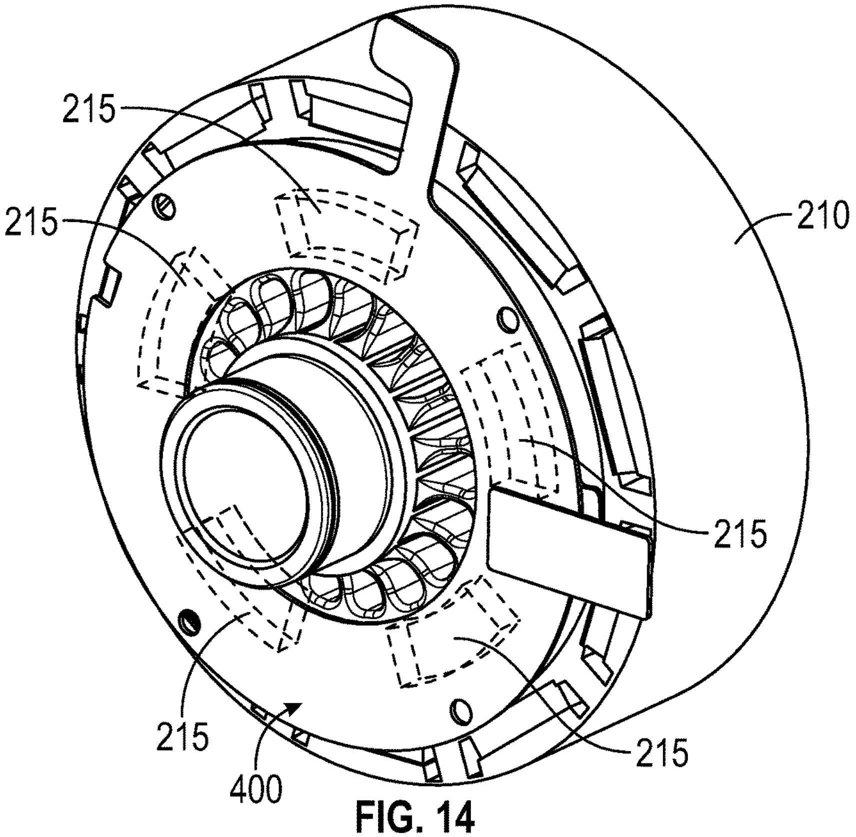
FIG. 14 is a version of FIG. 13 showing hidden details of the rotor.
Figure 15A:
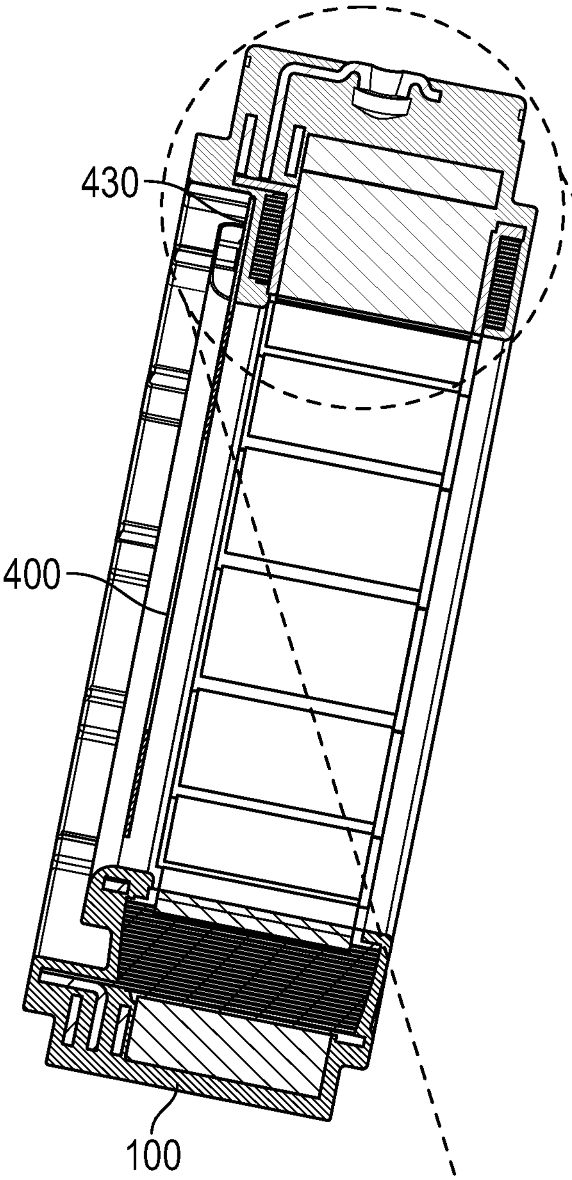
FIGS. 15A and 15B show a cross-section and detailed view of the stator assembly and encoder PCB.
Figure 15B:
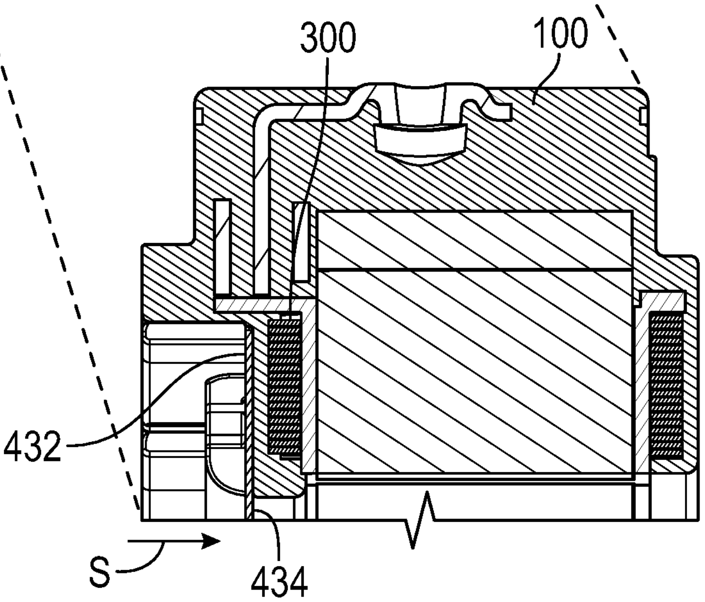

Electric machines often include an encoder to monitor the position and/or movement of the rotor 200 relative to the stator 100. A typical encoder may include a coding on the rotor provided by a plurality of targets. During rotation of the rotor the targets move into (and out of) alignment with the sensor arrangement of the encoder 400. As shown by the hidden features in hashed lines of FIG. 14, in the illustrated embodiment the targets are provided by five castellations 250 which are circumferentially distributed around the hub 210 of the rotor. The castellations 250 may be formed from a magnetic material such that they can be detected by induced currents in a circuit printed on the PCB board 410 of the encoder 400. The skilled person will appreciate that other encoder configurations may be possible, for example targets could be provided on the rotor by attaching one or more PCB elements.

As shown in FIGS. 12 to 19, the encoder 400 of embodiments has a modular configuration consisting of a separate encoder PCB board 410 and daughterboard 420 mounted on the encoder board. The encoder PCB board 410 is a generally annular disk shape extending between an inner opening 412 providing an opening for the shaft of the rotor 200 and an outer edge 414 having a diameter which is less than the inner diameter of the stator assembly 100. As will be explained in further detail below, the encoder 400 is fixed relative to the stator 100 (via attachment to the cover 500). As such, in use, it will be appreciated that the rotor 200 rotates relative to the encoder 400. The encoder PCB board 410 comprises a printed encoder inductive circuitry, for example a printed coil array. The daughterboard 420 is explained in further detail below.

Figure 12A:
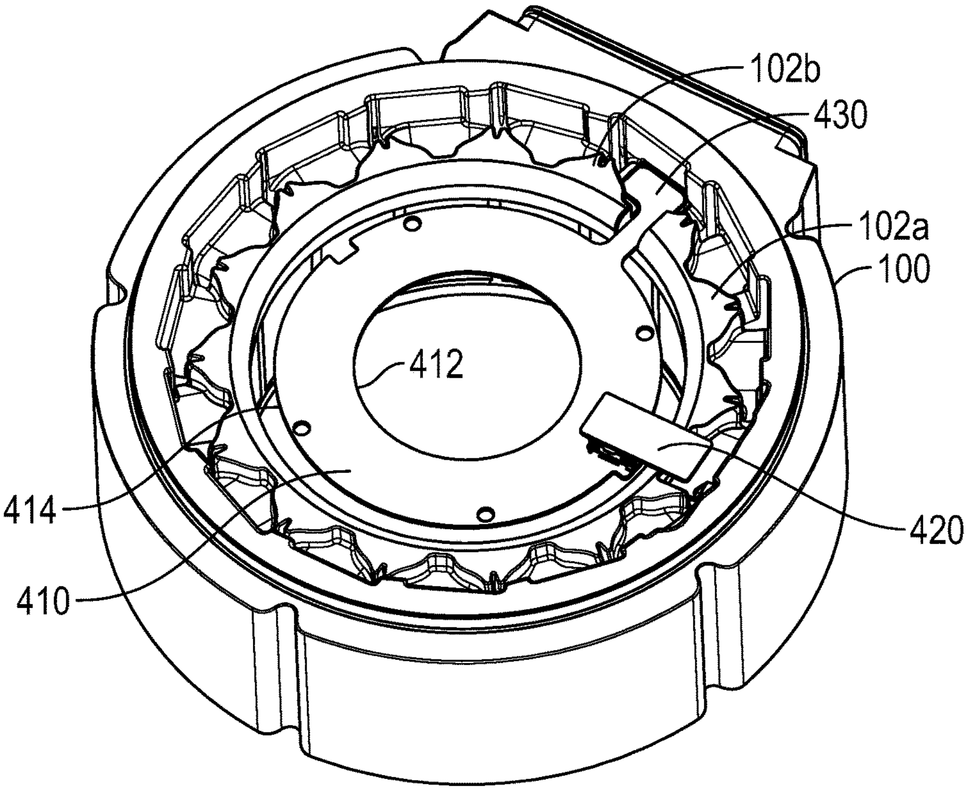
FIGS. 12A and 12B show a three-dimensional end view and detail of the stator assembly and aligned encoder assembly of an embodiment.
Figure 12B:
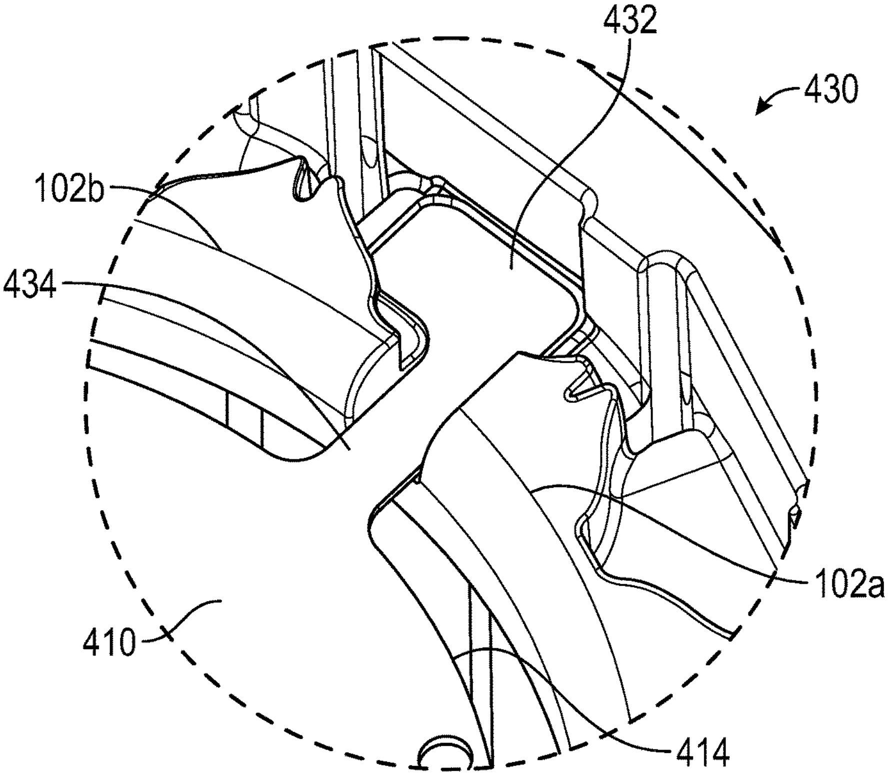
Figure 13:
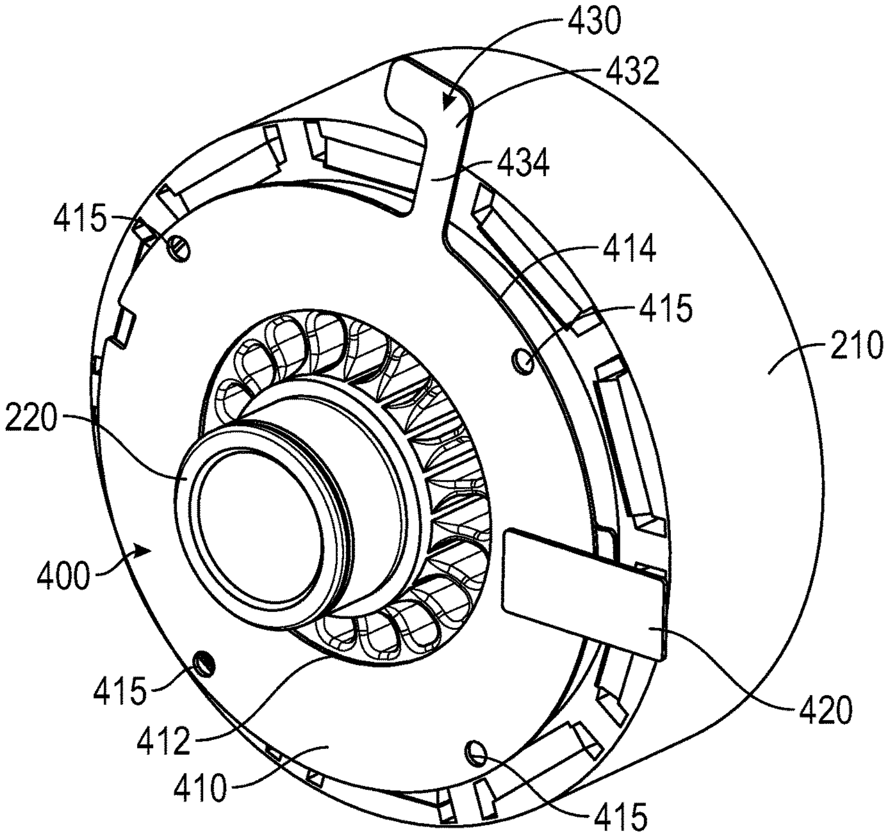
FIG. 13 shows an isolated view of the rotor assembly and aligned encoder assembly of an embodiment.

As best seen in FIG. 12 a further feature of the encoder 400 in embodiments is the provision of an integrated temperature sensor 430. Integrating the temperature sensor 430 with the board 410 of the encoder can reduce the overall part count of the electric machine 1.

The temperature sensor 430 is mounted on an arm 434 which extends radially outwardly from the encoder board 410. The temperature sensor 430 and encoder board 410 are formed on a single integrated substrate. The arm 434 projects radially outwardly from the outer edge 414 of the encoder board 410. As seen in the radial length of the arm 434 is such that the head portion 432 is aligned with the coils 300 of the stator 100 as shown in the cross section of FIG. 5. Advantageously, this arrangement may enable the temperature sensor 430 to abut a coil 300 without needing to be directly attached thereto. As such the temperature sensor 430 is neither prone to failure from detachment nor does it require removal if maintenance is required to the coil. The arm 434 of the temperature sensor has a reduced width in comparison to the head and may therefore be more easily accommodated between features of the stator such as the busbars 102. The narrowed neck of the arm 434 may reduce the compromise of having a radially extending feature such that it can pass easily between parts of the coil connections such as the ends 102*a* and 102*b* shown in FIG. 12.

PCB base materials (for example glass epoxy compounds) are generally resilient. As such, the position of the encoder board 400 and the temperature sensor 430 may be selected such that the head 432 of the sensor is spring biased into engagement with the coil 300 as shown by arrow S in FIG. 15B. It may be appreciated that the bias at the head 432 can be readily tailored when designing an electric machine by selecting the width and thickness of the arm 434 and the relative in use alignment positions of the PCB board 410 and the temperature sensor 430.

Figure 16A:
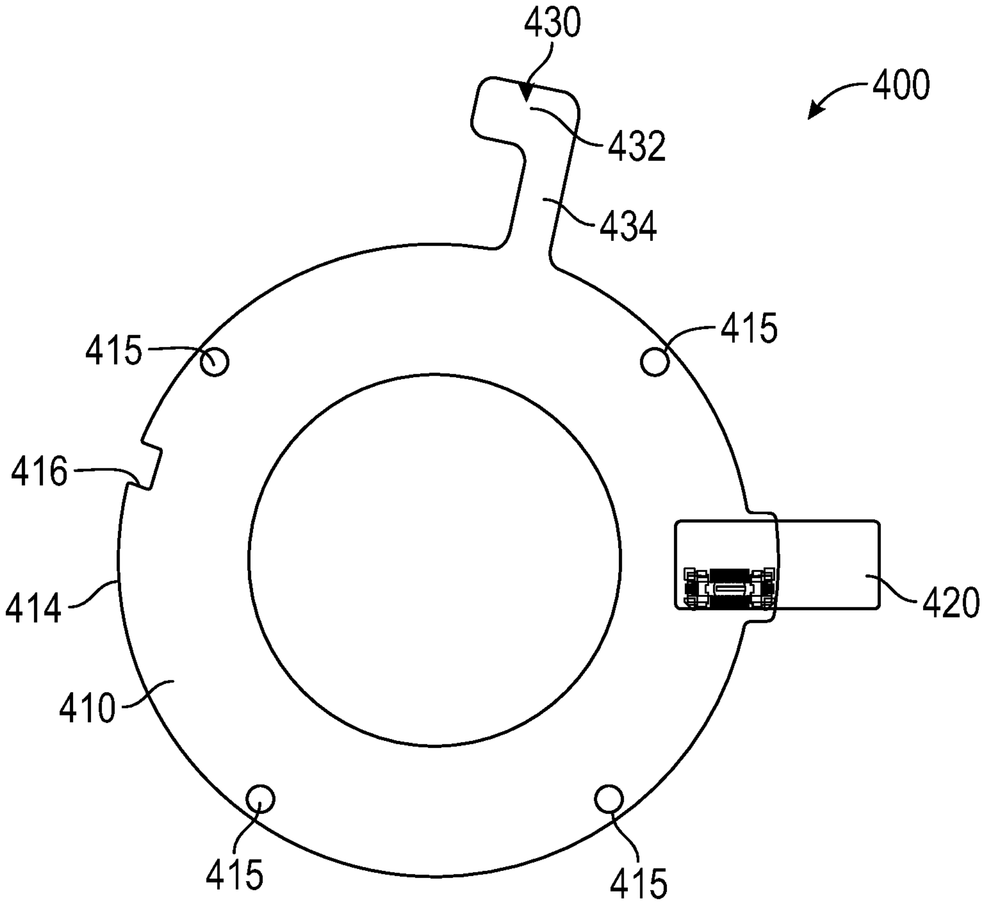
FIGS. 16A and 16B show side and end views of the encoder assembly in isolation.
Figure 16B:
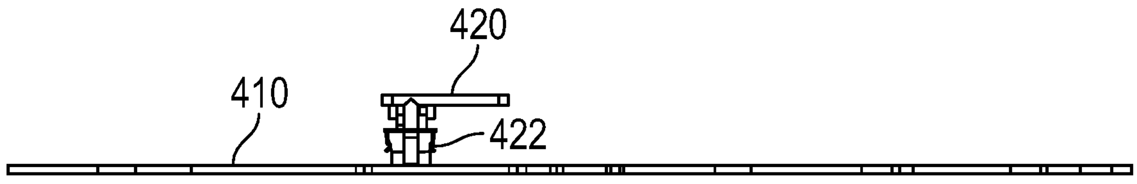
Figure 17:
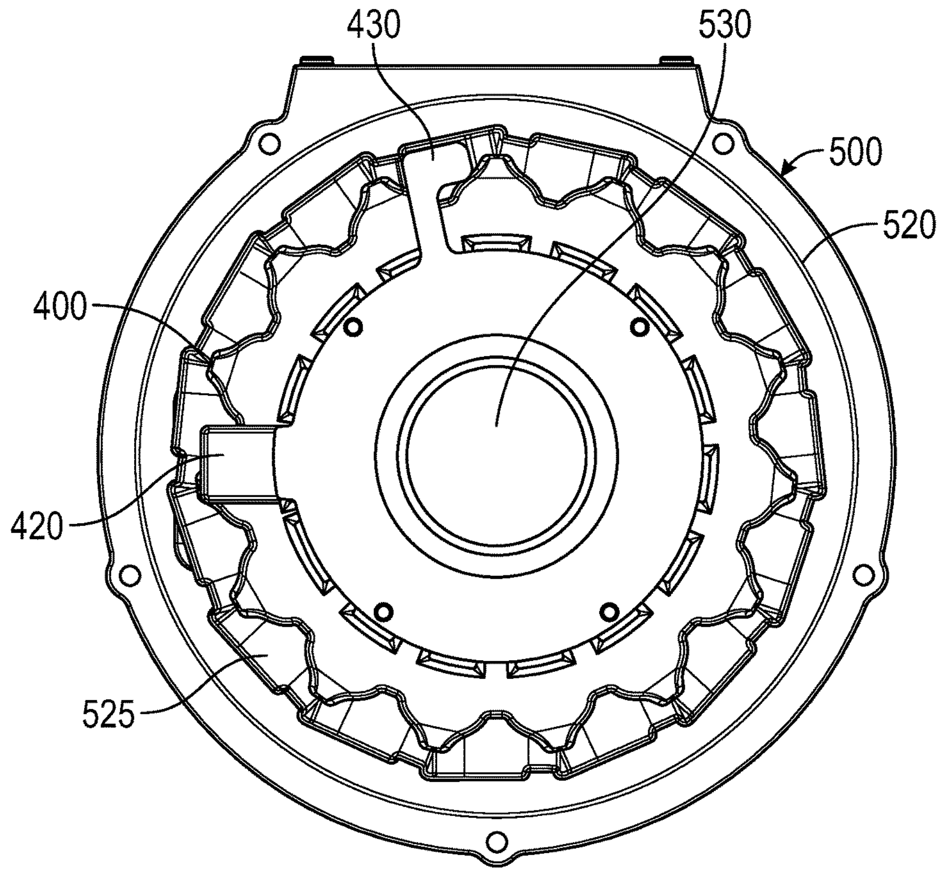
FIG. 17 shows an end view of the interior face of a cover and encoder for use in embodiments.
Figure 18:
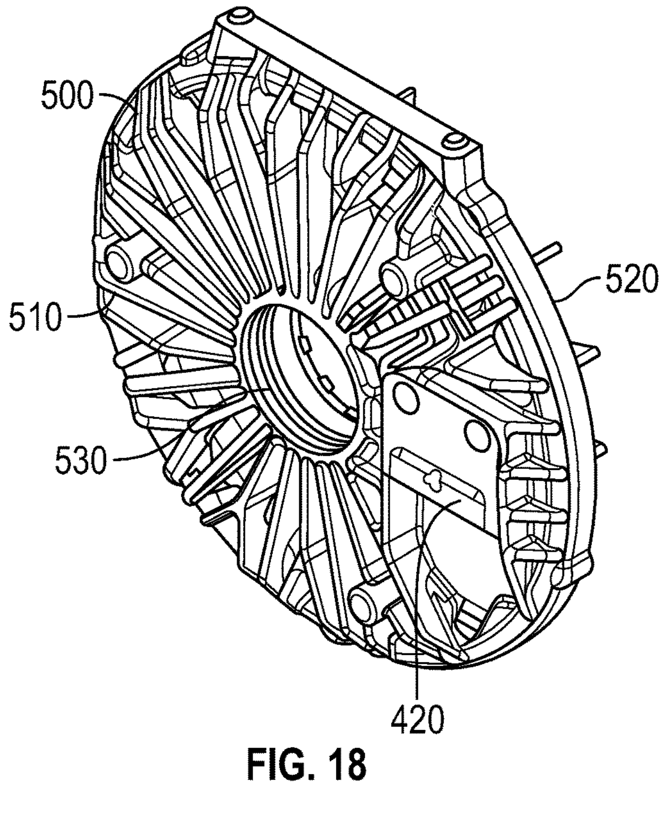
FIG. 18 shows a three-dimensional view of a cover for use in embodiments.
Figure 19A:
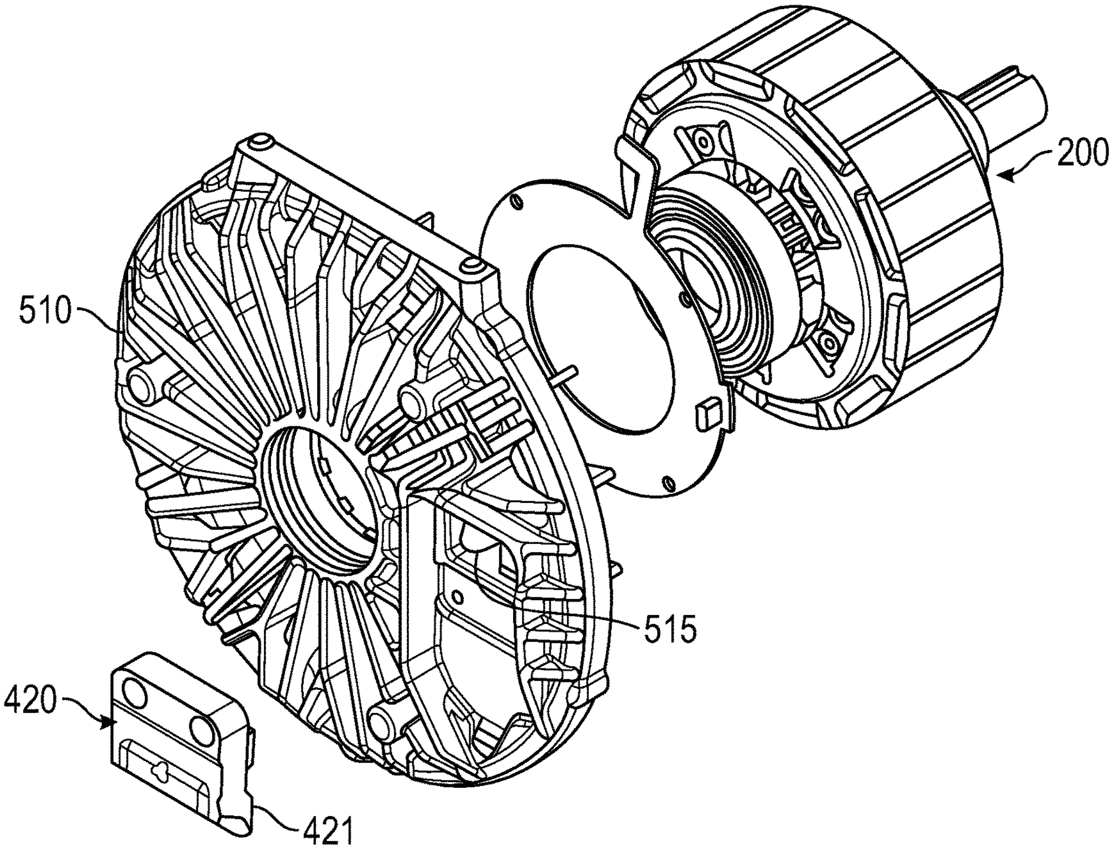
FIGS. 19A and 19B show internal and external exploded perspectives of the cover, encoder and rotor of an embodiment.
Figure 19B:
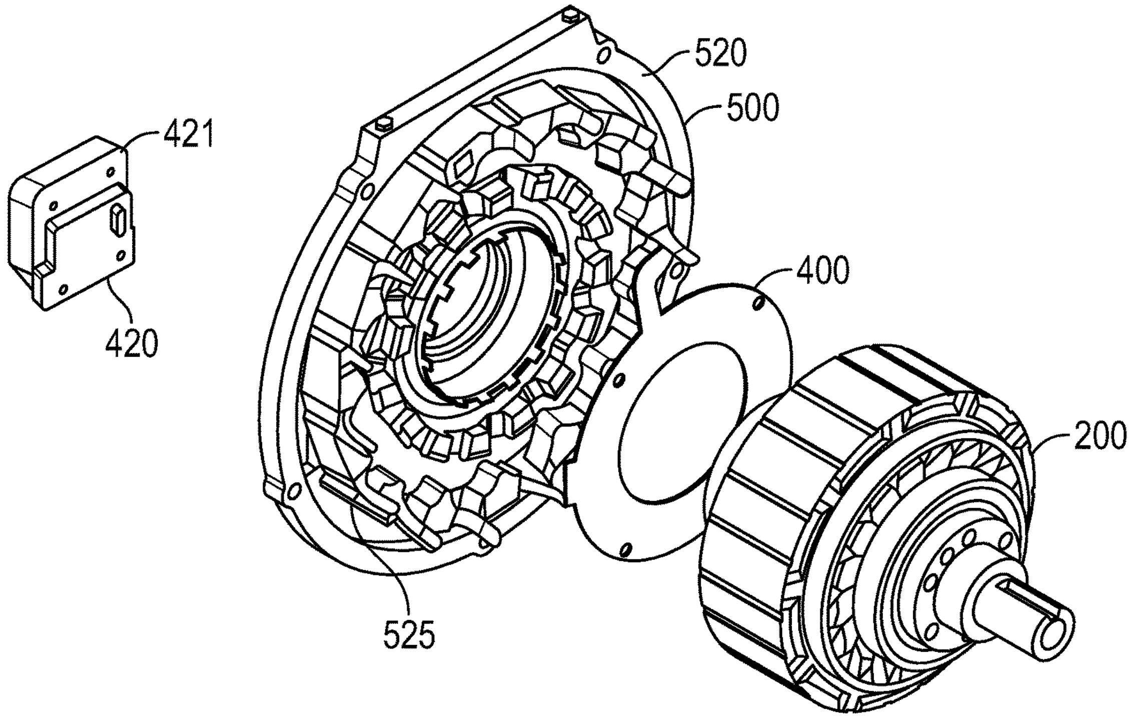
Figure 20:
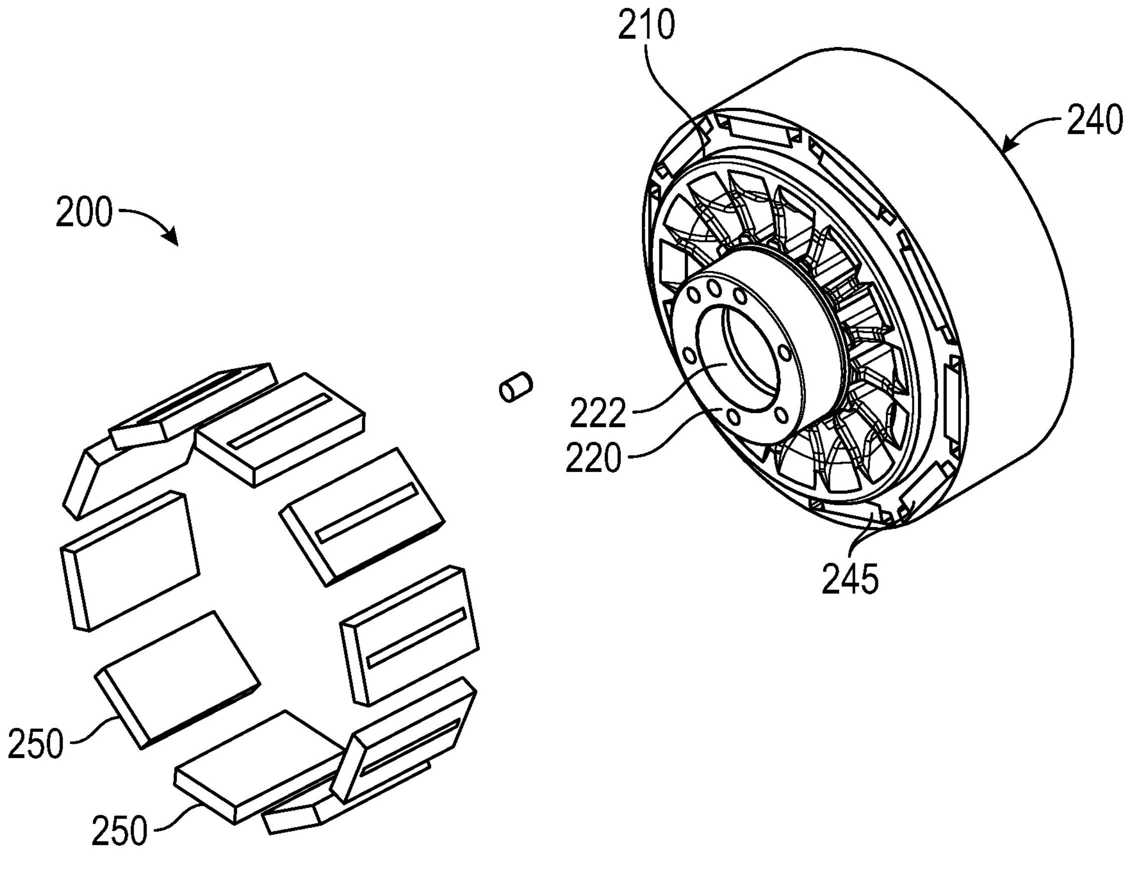
FIG. 20 shows a partial exploded view of a rotor assembly in accordance with an embodiment.
Figure 21A:
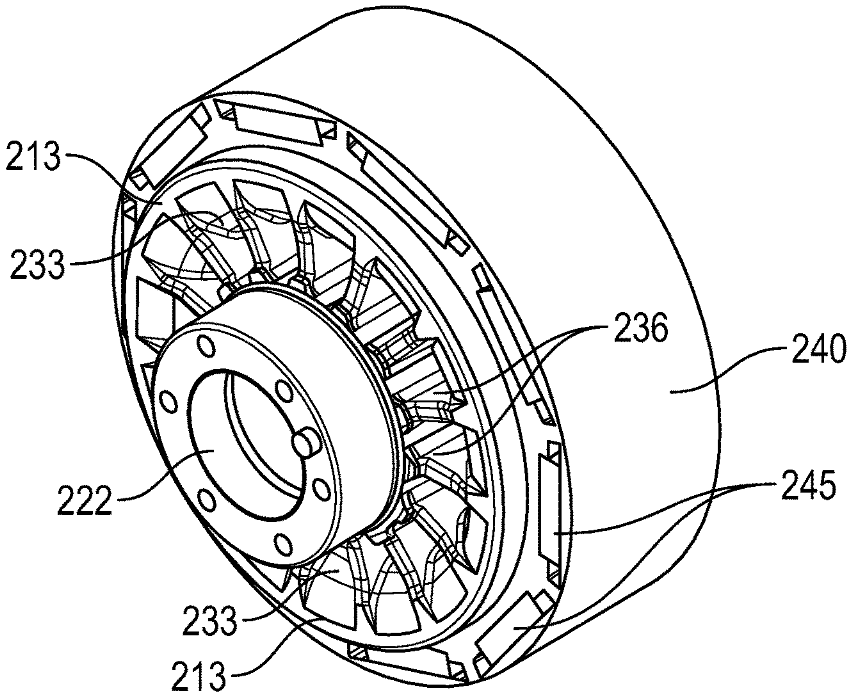
FIGS. 21A and 21B shows a perspective and end view of the rotor of an embodiment from a first axial direction.
Figure 21B:
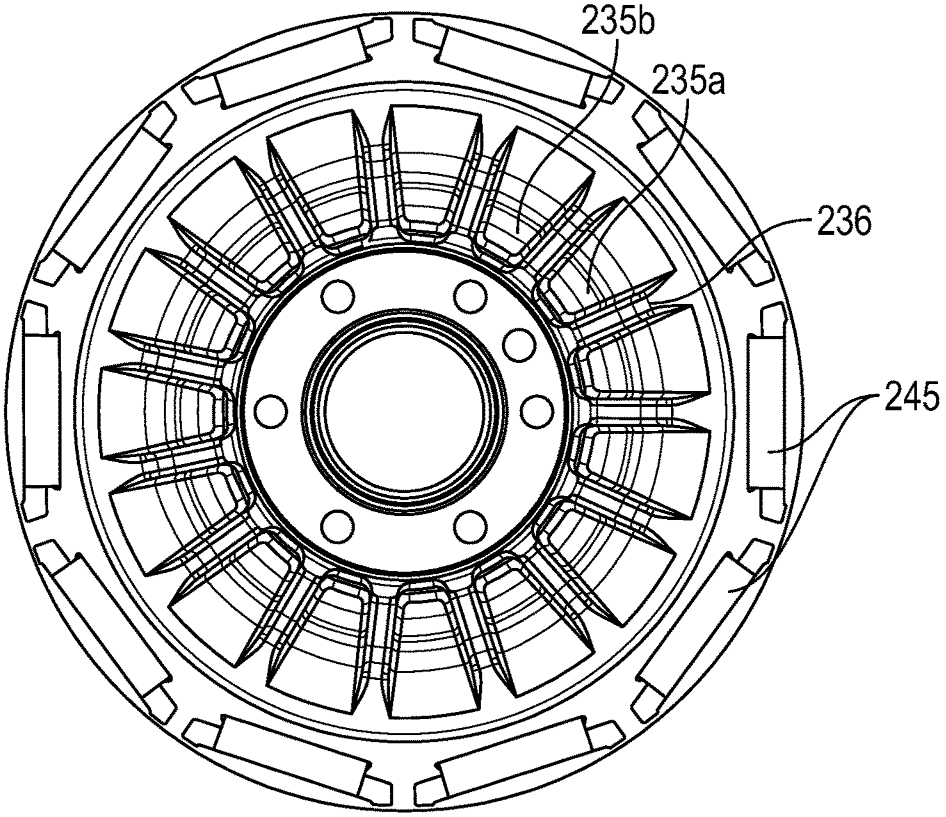

The configuration of the daughterboard 420 and the assembly of the electric machine 1 with the encoder 400 will now be described in further detail with reference to FIGS. 16 to 19. FIG. 16 shows the encoder 400 in isolation. It may be noted that the main PCB board 410 includes connection features such as a plurality of attachment holes 415 and an alignment feature 416 which helps ensure correct and accurate alignment of the encoder PCB Board 410 within the stator assembly 100 of the electric machine 1. The daughterboard 420 is connected to the PCB board 410 via a board-to-board connector 422 which provides a removable physical and electrical connection between the boards. The connector 422 may for example include a snap fit type resilient connection.

The daughterboard 420 includes the controller. The encoder board 410 includes the inductive circuitry required to pick up the position data from the coding on the rotor 200 (for example provided by the targets 250). The encoder board 410 must be precisely aligned within the electric machine to ensure accurate encoder function. The provision of a separate daughterboard 420 enables the controller to be replaceable without the encoder board 410 being removed from the electric machine 1 (for the example for repair or upgrading). This provides an advantage since it does not require the encoder board 410 to be re-aligned when a change (for example maintenance or upgrade) is required on the daughterboard.

In particular, the end cover 500 of the electric machine 1 may be used for attachment of the encoder 400. The cover 500 may be an axial end plate which attaches to the stator 100 enclosing the coils 300 and rotor 200. The cover has an axially internal face 520, shown in FIG. 17, and an axially external face 510 shown in FIG. 18. It will be appreciated that the cover 500 may seal the electric machine 1 to provide environmental and electrical protection and includes an opening 530 through which the shaft 220 or the rotor can project.

The encoder board 410 is affixed to the interior face 520 of the cover 500 via screws or other fixings passing through the holes 415. At this stage, the daughterboard 420 is not connected to the encoder board 410. The cover 500 with the encoder PCB board 410 is then connected to the stator 100 with the rotor 200 captive within the electric machine 1. Attachment of the cover 500 aligns both the PCB encoder board 410 and the temperature 430. The daughterboard 420 may then be attached to the PCB encoder board 410 by positioning the connector 422 through a window 515 which extends axially through the cover 500. The daughterboard 420 may be enclosed in a protective casing 421. With the electric machine 1 assembled the daughterboard 420 may be readily accessed from the exterior 510 (for example by removal of its cover 421) of the cover 500. The PCB encoder board 410 can remain internal to the case 500 and does not, therefore, need to be realigned during maintenance.

Although the invention has been described above with reference to preferred embodiments, it will be appreciated that various changes or modification may be made without departing from the scope of the invention as defined in the appended claims. For example, whilst the illustrated embodiment described above comprises an internal rotor and external stator embodiments of the invention need not be limited to such an arrangement. In this regard the skilled person will appreciate that some motors use a stator having an internal annular stator core with outwardly projecting pole teeth. It will be appreciated that embodiments of the present disclosure can easily be adapted to such an arrangement without the departing from the scope of the invention. Likewise whilst the flange members 351 and 352 of the insulator bobbin 320 are described with respect to a single member on each side of the insulator it will be appreciated that the members (and the arms carrying them) could be formed of a plurality of separate sections depending upon the size and configuration of the stator 100 and insulator 300.

The invention claimed is:

1. A stator core segment, comprising:
a body defining a segment of an annular ring; and
a pole tooth projecting radially from the body; the pole tooth comprising
a pair of tooth tips which have
an initial configuration in which they extend longitudinally with respect to the pole tooth and
an assembled configuration in which they extend transversely to provide a flange at a pole tooth end,
wherein each tooth tip comprises a web contiguous with the pole tooth and a head at a distal end of the web, and
wherein the pole tooth has a recess in a shoulder proximal to each tooth tip, the recess defining a seat to receiving and aligning a portion of the head when the tooth tip is in the assembled configuration, and
wherein the head comprises a first portion proximal to the web and a second portion distal to the web, and
wherein in the assembled configuration the first portion engages the seat and the second portion extends transversely beyond the pole tooth, and
wherein the first portion of the head and the seat have complementary profiles which resiliently engage, and
wherein the complementary profiles comprise an undercut on the seat and a latch defined in the head for engaging the undercut.

2. The stator core segment of claim 1, wherein the head proximal to the web defines a notch or barb to latch the undercut of the seat.

3. The stator core segment of claim 1, further comprising a bobbin carrying a coil.

4. The stator core segment of claim 3, wherein the bobbin resiliently engages a distal end of the tooth tip when the tip is in the assembled configuration.

5. The stator core segment of claim 1,
wherein the undercut comprises a retention surface that extends inwardly relative to the seat such that the retention surface opposes withdrawal of the head from the seat.

6. The stator core segment of claim 1,
wherein the latch engages behind an overhanging surface of the undercut in the assembled configuration.

7. The stator core segment of claim 6,
wherein the latch comprises a projection on the first portion of the head having a surface facing toward the web, the surface cooperating with the overhanging surface of the undercut to resist removal of the head from the seat.

* * * * *